(12) United States Patent
Saki et al.

(10) Patent No.: US 11,410,677 B2
(45) Date of Patent: Aug. 9, 2022

(54) ADAPTIVE SOUND EVENT CLASSIFICATION

(71) Applicant: QUALCOMM Incorporated, San Diego, CA (US)

(72) Inventors: Fatemeh Saki, San Diego, CA (US); Yinyi Guo, San Diego, CA (US); Erik Visser, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/102,724

(22) Filed: Nov. 24, 2020

(65) Prior Publication Data

US 2022/0165292 A1 May 26, 2022

(51) Int. Cl.
- *H04R 29/00* (2006.01)
- *G10L 25/51* (2013.01)
- *G06N 20/00* (2019.01)
- *G06N 5/04* (2006.01)
- *H04R 1/08* (2006.01)

(52) U.S. Cl.
CPC ............. *G10L 25/51* (2013.01); *G06N 5/04* (2013.01); *G06N 20/00* (2019.01); *H04R 1/08* (2013.01)

(58) Field of Classification Search
CPC .................................................. H04R 29/00
See application file for complete search history.

(56) References Cited

U.S. PATENT DOCUMENTS

| | | | |
|---|---|---|---|
| 4,827,521 A | 5/1989 | Bahl et al. | |
| 8,463,648 B1 | 6/2013 | Bierner et al. | |
| 9,165,556 B1 | 10/2015 | Sugar et al. | |
| 9,412,361 B1 | 8/2016 | Geramifard et al. | |
| 9,812,152 B2 | 11/2017 | Christian et al. | |
| 10,026,401 B1 | 7/2018 | Mutagi et al. | |
| 2003/0028384 A1 | 2/2003 | Kemp et al. | |
| 2005/0187770 A1 | 8/2005 | Kompe et al. | |
| 2007/0033005 A1 | 2/2007 | Cristo et al. | |
| 2007/0043574 A1 | 2/2007 | Coffman et al. | |
| 2007/0050191 A1 | 3/2007 | Weider et al. | |

(Continued)

OTHER PUBLICATIONS

Barchiesi D., et al., "Acoustic Scene Classification", IEEE Signal Processing Magazine, May 2015, vol. 32, No. 3, pp. 16-34.

(Continued)

*Primary Examiner* — Olisa Anwah
(74) *Attorney, Agent, or Firm* — Moore IP

(57) ABSTRACT

A device includes one or more processors configured to provide audio data samples to a sound event classification model. The one or more processors are also configured to determine, based on an output of the sound event classification model responsive to the audio data samples, whether a sound class of with the audio data samples was recognized by the sound event classification model. The one or more processors are further configured to, based on a determination that the sound class was not recognized, determine whether the sound event classification model corresponds to an audio scene associated with the audio data samples. The one or more processors are also configured to, based on a determination that the sound event classification model corresponds to the audio scene associated with the audio data samples, store model update data based on the audio data samples.

30 Claims, 11 Drawing Sheets

(56) References Cited

U.S. PATENT DOCUMENTS

| | | |
|---|---|---|
| 2007/0183604 A1 | 8/2007 | Araki et al. |
| 2009/0106022 A1 | 4/2009 | Madani |
| 2011/0166856 A1 | 7/2011 | Lindahl et al. |
| 2011/0173539 A1 | 7/2011 | Rottler et al. |
| 2012/0089396 A1 | 4/2012 | Patel et al. |
| 2014/0074466 A1 | 3/2014 | Sharifi et al. |
| 2014/0161270 A1 | 6/2014 | Peters et al. |
| 2015/0066479 A1 | 3/2015 | Pasupalak et al. |
| 2015/0213119 A1 | 7/2015 | Agarwal et al. |
| 2016/0012020 A1 | 1/2016 | George et al. |
| 2016/0176309 A1 | 6/2016 | Jeon et al. |
| 2016/0225389 A1 | 8/2016 | Jinnai et al. |
| 2016/0259775 A1 | 9/2016 | Gelfenbeyn et al. |
| 2017/0076727 A1 | 3/2017 | Ding et al. |
| 2017/0116986 A1 | 4/2017 | Weng et al. |
| 2017/0124818 A1 | 5/2017 | Ullrich et al. |
| 2017/0154176 A1 | 6/2017 | Yun et al. |
| 2017/0193097 A1 | 7/2017 | Cramer et al. |
| 2017/0270919 A1 | 9/2017 | Parthasarathi et al. |
| 2017/0278514 A1 | 9/2017 | Mathias et al. |
| 2017/0323643 A1 | 11/2017 | Arslan et al. |
| 2018/0121034 A1 | 5/2018 | Baker et al. |
| 2018/0144615 A1 | 5/2018 | Kinney et al. |
| 2018/0150897 A1 | 5/2018 | Wang et al. |
| 2018/0158288 A1* | 6/2018 | Logan .................... G01S 19/51 |
| 2019/0050875 A1 | 2/2019 | McCord |
| 2019/0066693 A1 | 2/2019 | Ziv et al. |
| 2019/0130910 A1 | 5/2019 | Kariya et al. |
| 2019/0171409 A1 | 6/2019 | Boulanger et al. |
| 2019/0205395 A1 | 7/2019 | Bonin et al. |
| 2021/0020018 A1* | 1/2021 | Kim ........................ G08B 7/06 |

OTHER PUBLICATIONS

Kingma D.P., et al., "Adam: A Method for Stochastic Optimization", arXiv:1412.6980v9 [cs.LG], Jan. 30, 2017, International Conference for Learning Representations, 2015, pp. 1-15.

Krsmanovic F., et al., "Have we met? MDP Based Speaker ID for Robot Dialogue", Proceedings of Interspeech 2006, Sep. 17, 2006, XP055117559, table 3, section 2, 4 pages.

Salamon J., et al., "Deep Convolutional Neural Networks and Data Augmentation for Environmental Sound Classification", arXiv:1608.04363v2 [cs.SD], IEEE Signal Processing Letters, Accepted, Nov. 28, 2016, 5 pages.

Tax D.M.J., et al., "Support Vector Domain Description", Pattern Recognition Letters 20, Elsevier, 1999, pp. 1191-1199.

Yang E., et al., "Mitigating User Frustration through Adaptive Feedback Based on Human Automation Etiquette Strategies", Industrial Engineering, Iowa State University, 2016, 195 Pages.

International Search Report and Written Opinion—PCT/US2021/072520—ISA/EPO—Mar. 9, 2022.

Koh E., et al., "Incremental Learning Algorithm for Sound Event Detection", 2020 IEEE International Conference on Multimedia and Expo (ICME), Cornell University Library, 201 OLIN Library Cornell University, IEEE, Jul. 6, 2020 (Jul. 6, 2020), pp. 1-6, XP033808247, DOI: 10.1109/ICME46284.2020.9102859, Mar. 26, 2020 (Mar. 26, 2020), [retrieved on May 7, 2020], The Whole Document, figure 1 Sections 1, 2.

* cited by examiner

ADAPTIVE SOUND EVENT CLASSIFICATION

I. FIELD

The present disclosure is generally related to adaptive sound event classification.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities, including, for example a Sound Event Classification (SEC) system that attempts to recognize sound events (e.g., slamming doors, car horns, etc.) in an audio signal.

An SEC system is generally trained using a supervised machine learning technique to recognize a specific set of sounds that are identified in labeled training data. As a result, each SEC system tends to be domain specific (e.g., capable of classifying a predetermined set of sounds). After the SEC system is trained, it is difficult to update the SEC system to recognize new sound classes that were not identified in the labeled training data. Additionally, some sound classes that the SEC system is trained to detect may represent sound events that have more variants than are represented in the labeled training data. To illustrate, the labeled training data may include audio data samples for many different doorbells but is unlikely to include all of the existing variants of doorbell sounds. Retraining the SEC system to recognize a new sound that was not represented in the training data used to train the SEC system may involve completely retraining the SEC system using a new set of labeled training data that includes examples for the new sound in addition to the original training data. As a result, training an SEC system to recognize a new sound (whether for a new sound class or a variant of an existing sound class) requires approximately the same computing resources (e.g., processor cycles, memory, etc.) as generating a brand-new SEC system. Further, over time, as even more sounds are added to be recognized, the number of audio data samples that must be maintained and used to train the SEC system can become unwieldy.

III. SUMMARY

In a particular aspect, a device includes one or more processors configured to provide audio data samples to a sound event classification model and to receive an output of the sound event classification model responsive to the audio data samples. The one or more processors are also configured to determine, based on the output, whether a sound class of the audio data samples was recognized by the sound event classification model. The one or more processors are further configured to, based on a determination that the sound class was not recognized, determine whether the sound event classification model corresponds to an audio scene associated with the audio data samples. The one or more processors are also configured to, based on a determination that the sound event classification model corresponds to the audio scene associated with the audio data samples, store model update data based on the audio data samples.

In a particular aspect, a method includes providing, by one or more processors, audio data samples as input to a sound event classification model. The method also includes determining, by the one or more processors based on an output of the sound event classification model responsive to the audio data samples, whether a sound class of the audio data samples was recognized by the sound event classification model. The method further includes, based on a determination that the sound class was not recognized, determining, by the one or more processors, whether the sound event classification model corresponds to an audio scene associated with the audio data samples. The method also includes, based on a determination that the sound event classification model corresponds to the audio scene associated with the audio data samples, storing, by the one or more processors, model update data based on the audio data samples.

In a particular aspect, a device includes means for providing audio data samples to a sound event classification model. The device also includes means for determining, based on an output of the sound event classification model, whether a sound class of the audio data samples was recognized by the sound event classification model. The device further includes means for determining, responsive to a determination that the sound class was not recognized, whether the sound event classification model corresponds to an audio scene associated with the audio data samples. The device also includes means for storing, responsive to a determination that the sound event classification model corresponds to the audio scene associated with the audio data samples, model update data based on the audio data samples.

In a particular aspect, a non-transitory computer-readable storage medium includes instructions that when executed by a processor, cause the processor to provide audio data samples as input to a sound event classification model. The instructions, when executed by a processor, also cause the processor to determine, based on an output of the sound event classification model responsive to the audio data samples, whether a sound class of the audio data samples was recognized by the sound event classification model. The instructions, when executed by a processor, further cause the processor, based on a determination that the sound class was not recognized, to determine whether the sound event classification model corresponds to an audio scene associated with the audio data samples. The instructions, when executed by a processor, also cause the processor, based on a determination that the sound event classification model corresponds to the audio scene associated with the audio data samples, to store model update data based on the audio data samples.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 1:
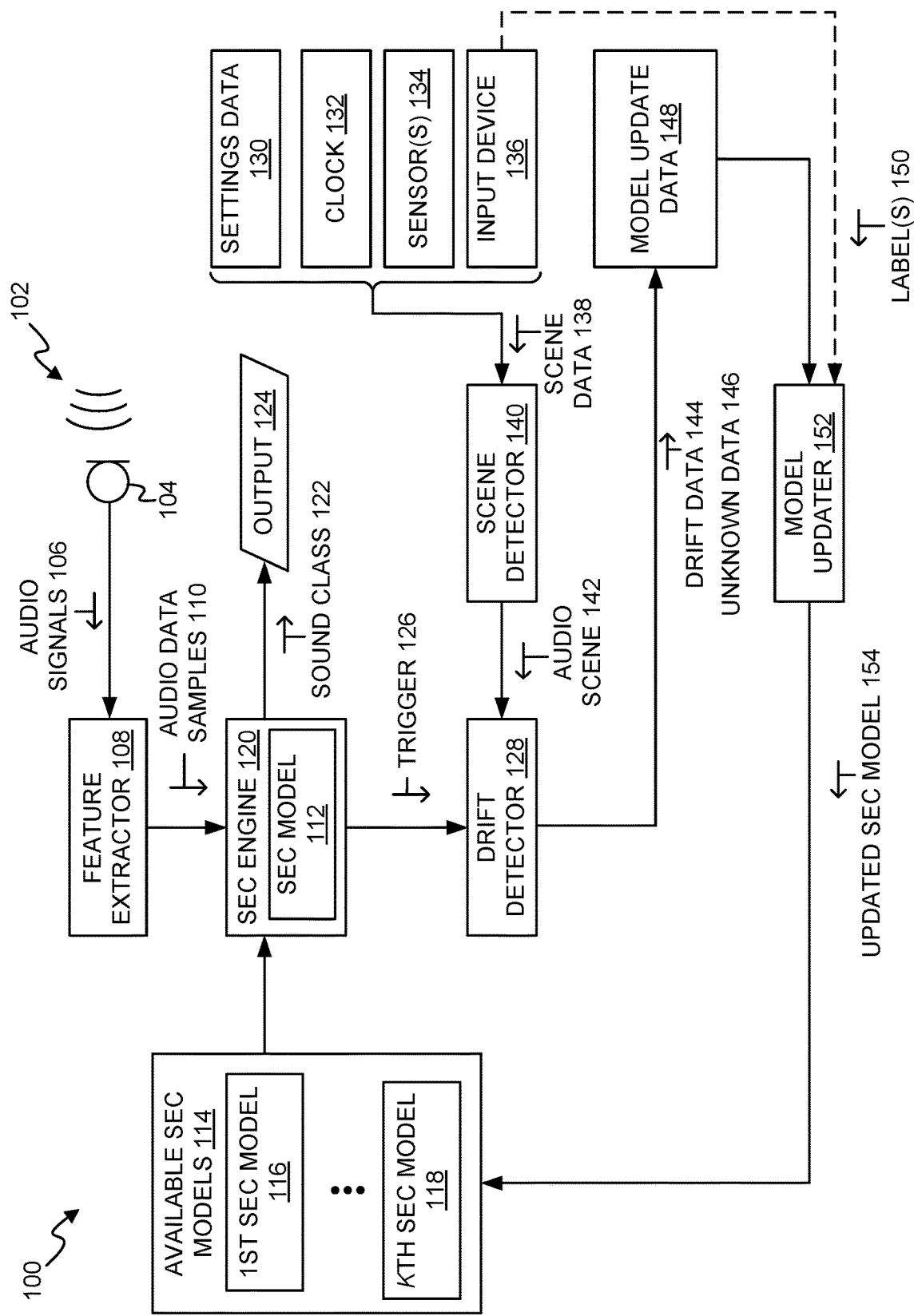
FIG. 1 is a block diagram of an example of a device that is configured to generate sound identification data responsive to audio data samples and configured to update a sound event classification model.
Figure 6:
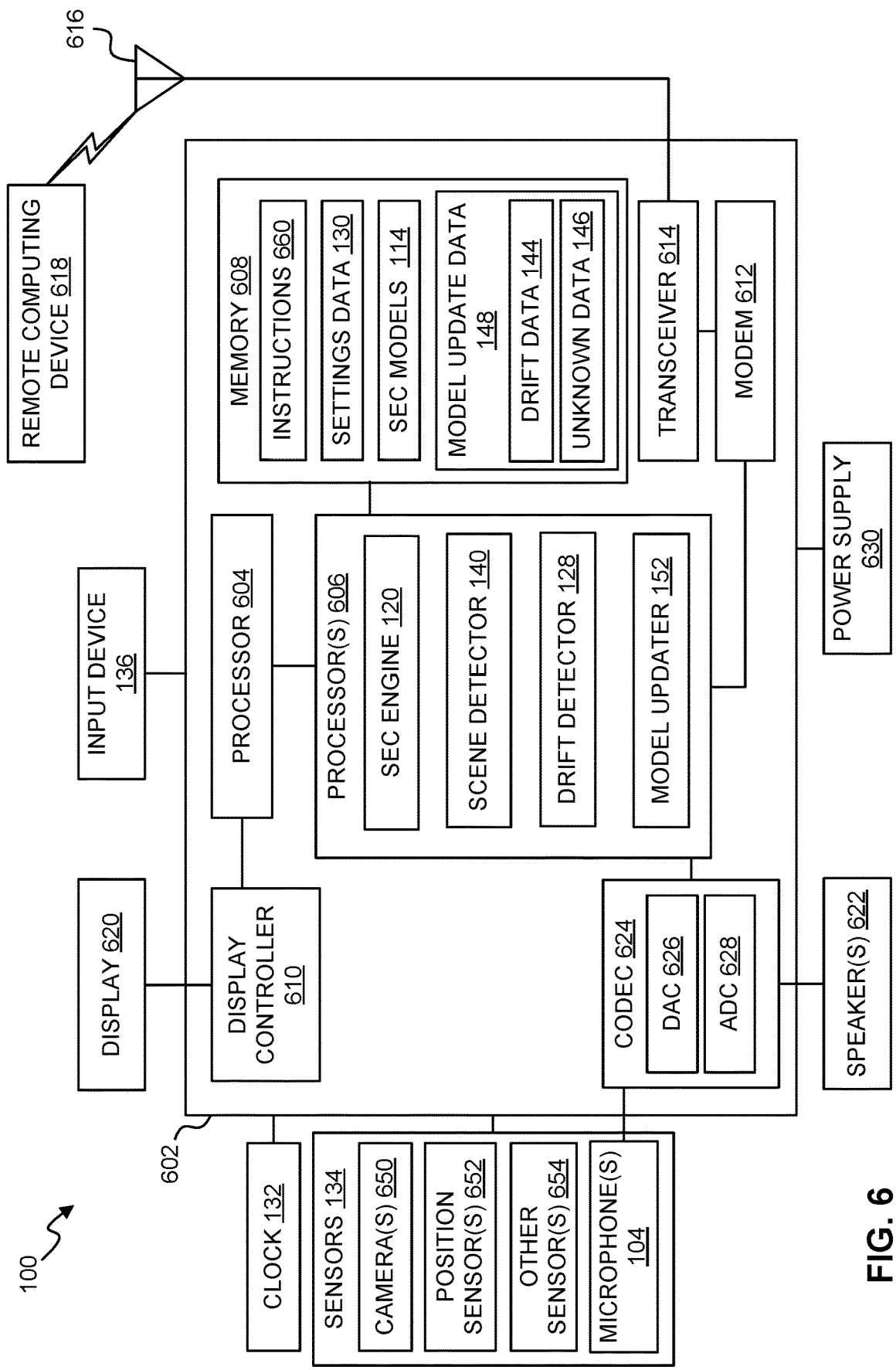

FIG. 6 a block diagram illustrating a particular example of the device of FIG. 1.

Figure 7:
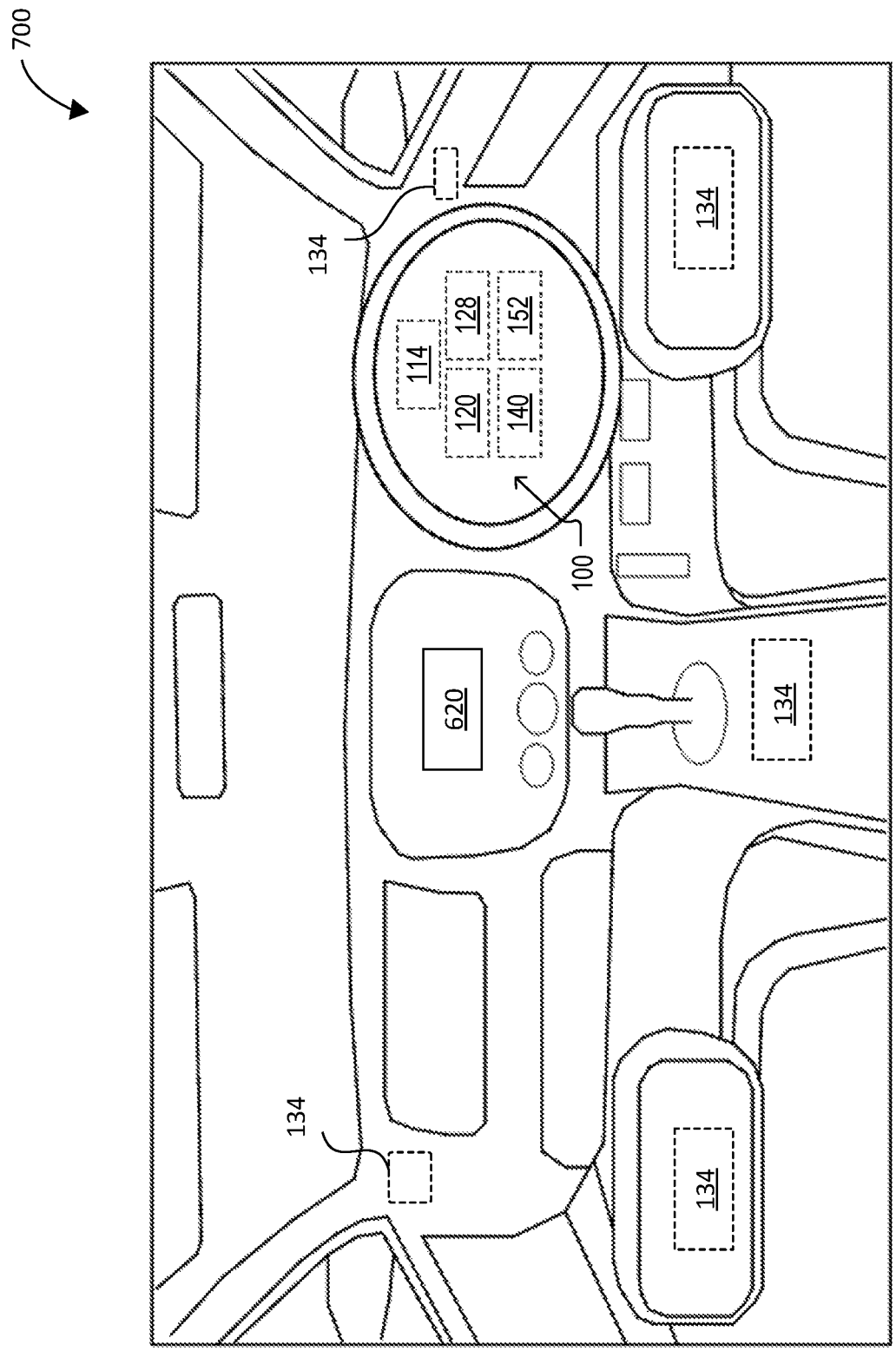

FIG. 7 is an illustrative example of a vehicle that incorporates aspects of the device of FIG. 1.

Figure 8:
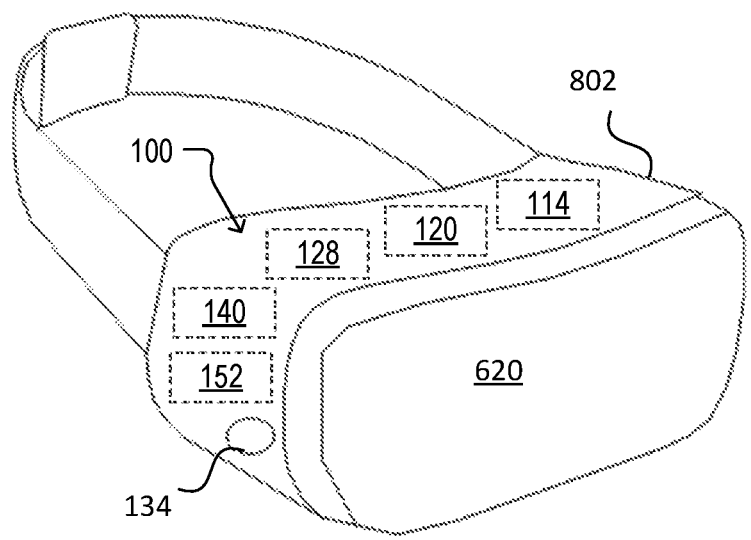

FIG. 8 illustrates virtual reality, mixed reality, or augmented reality headset that incorporates aspects of the device of FIG. 1.

Figure 9:
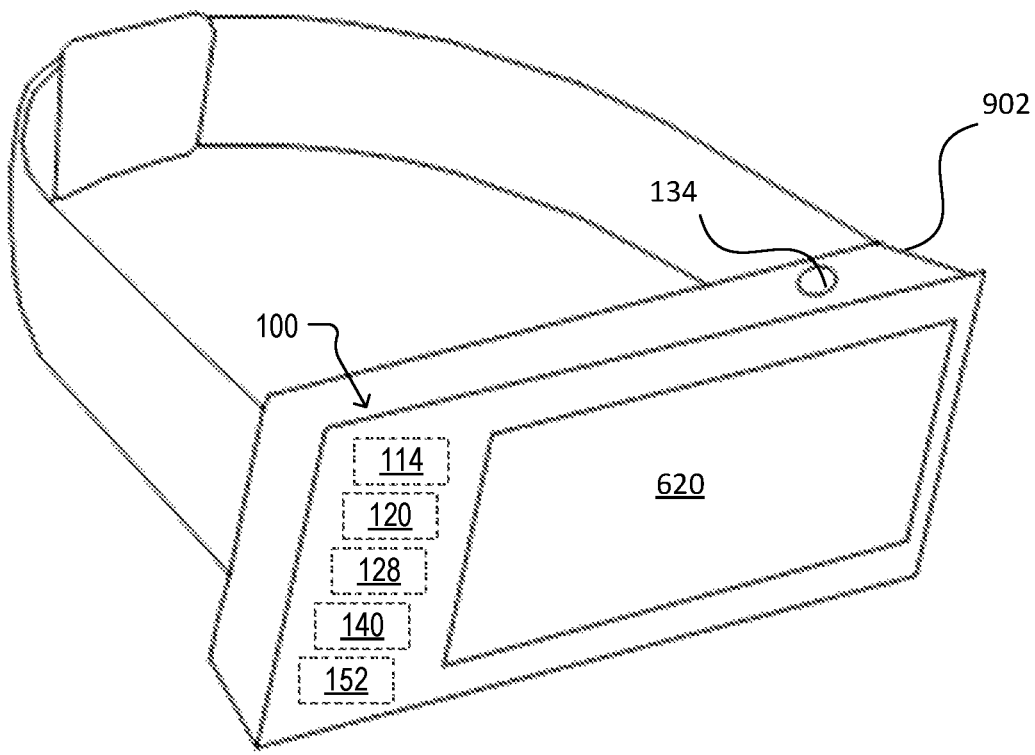

FIG. 9 illustrates a wearable electronic device that incorporates aspects of the device of FIG. 1.

Figure 10:
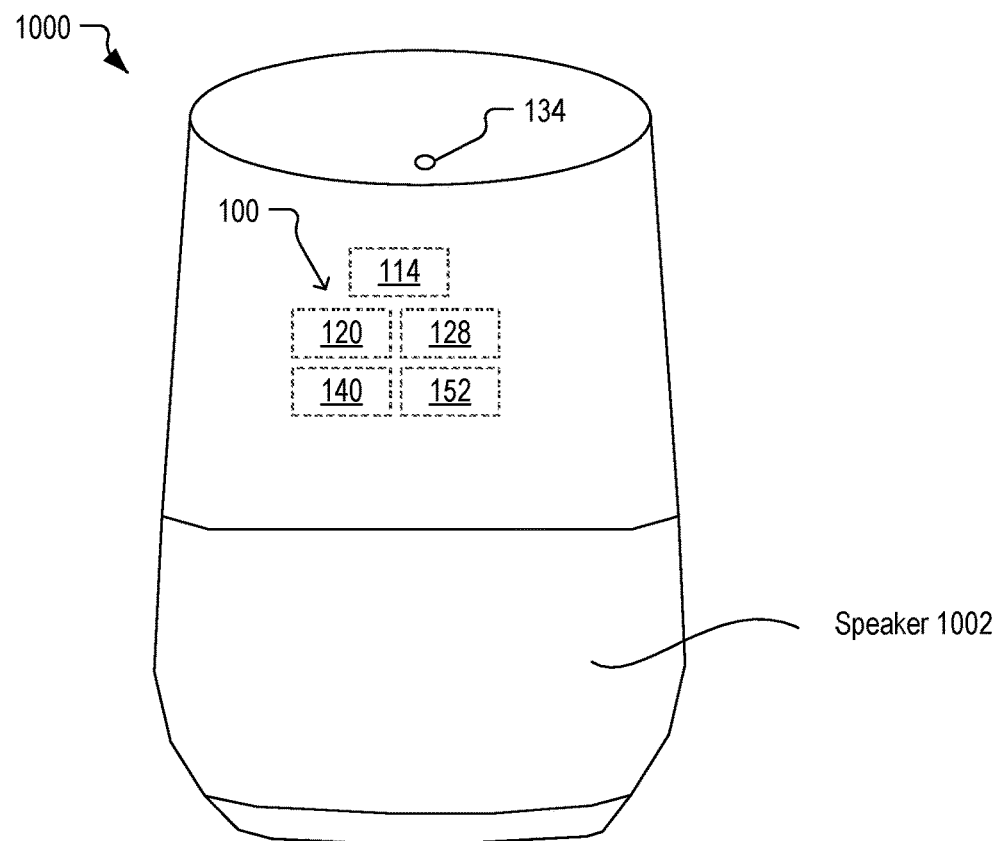

FIG. 10 illustrates a voice-controlled speaker system that incorporates aspects of the device of FIG. 1.

Figure 11:
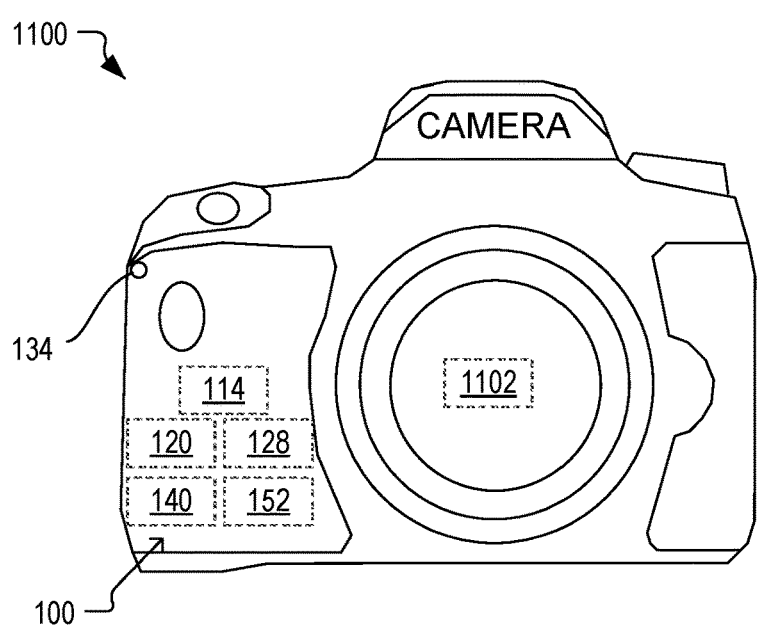

FIG. 11 illustrates a camera that incorporates aspects of the device of FIG. 1.

Figure 12:
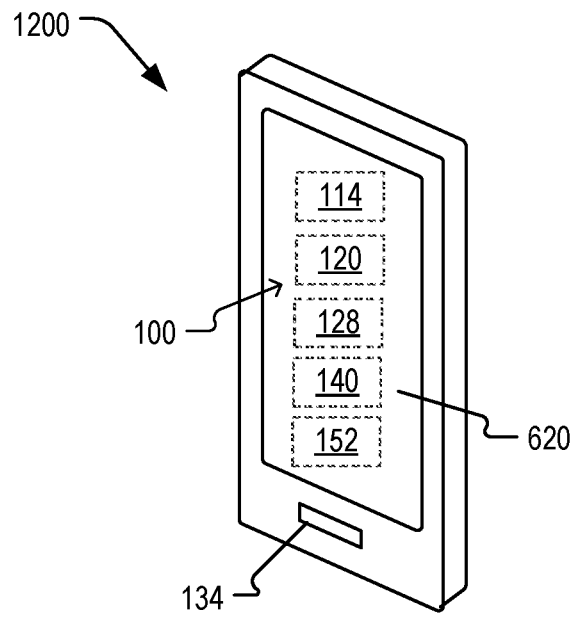

FIG. 12 illustrates a mobile device that incorporates aspects of the device of FIG. 1.

Figure 13:
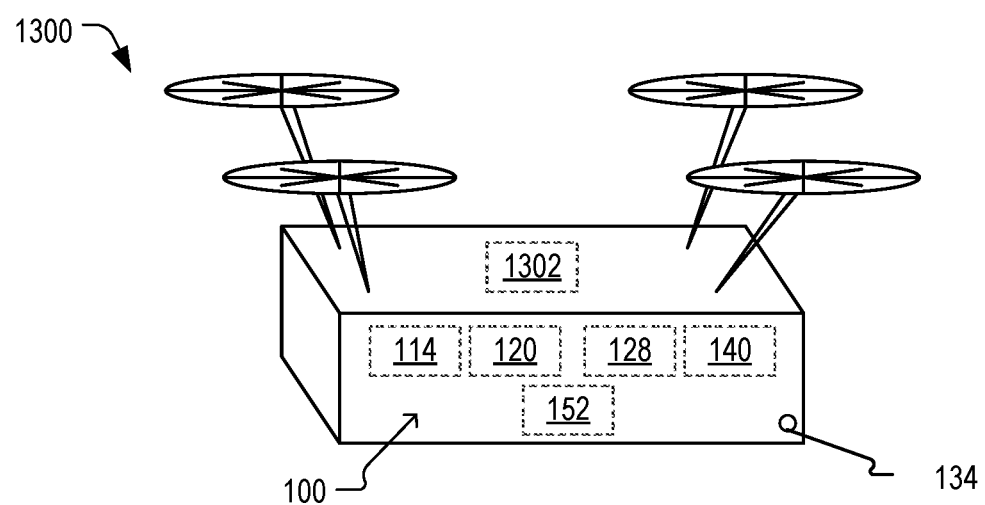

FIG. 13 illustrates an aerial device that incorporates aspects of the device of FIG. 1.

Figure 14:
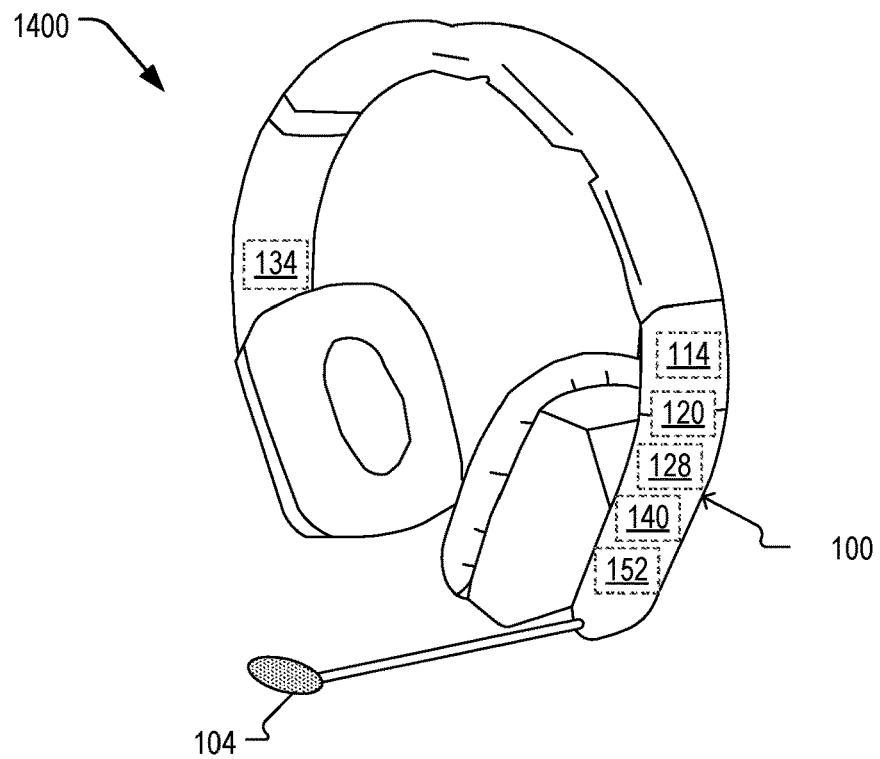

FIG. 14 illustrates a headset that incorporates aspects of the device of FIG. 1.

Figure 15:
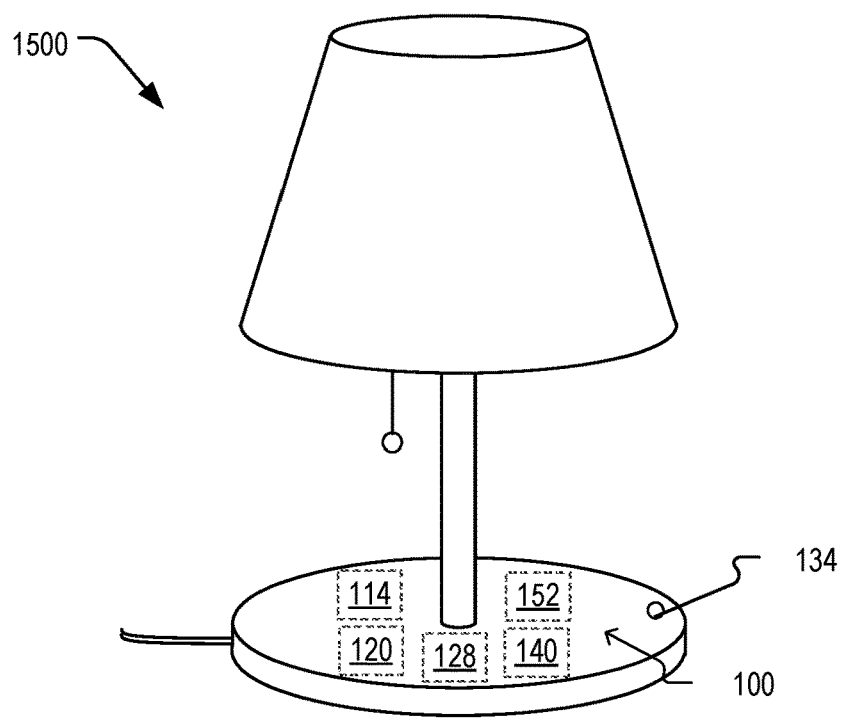

FIG. 15 illustrates an appliance that incorporates aspects of the device of FIG. 1.

Figure 16:
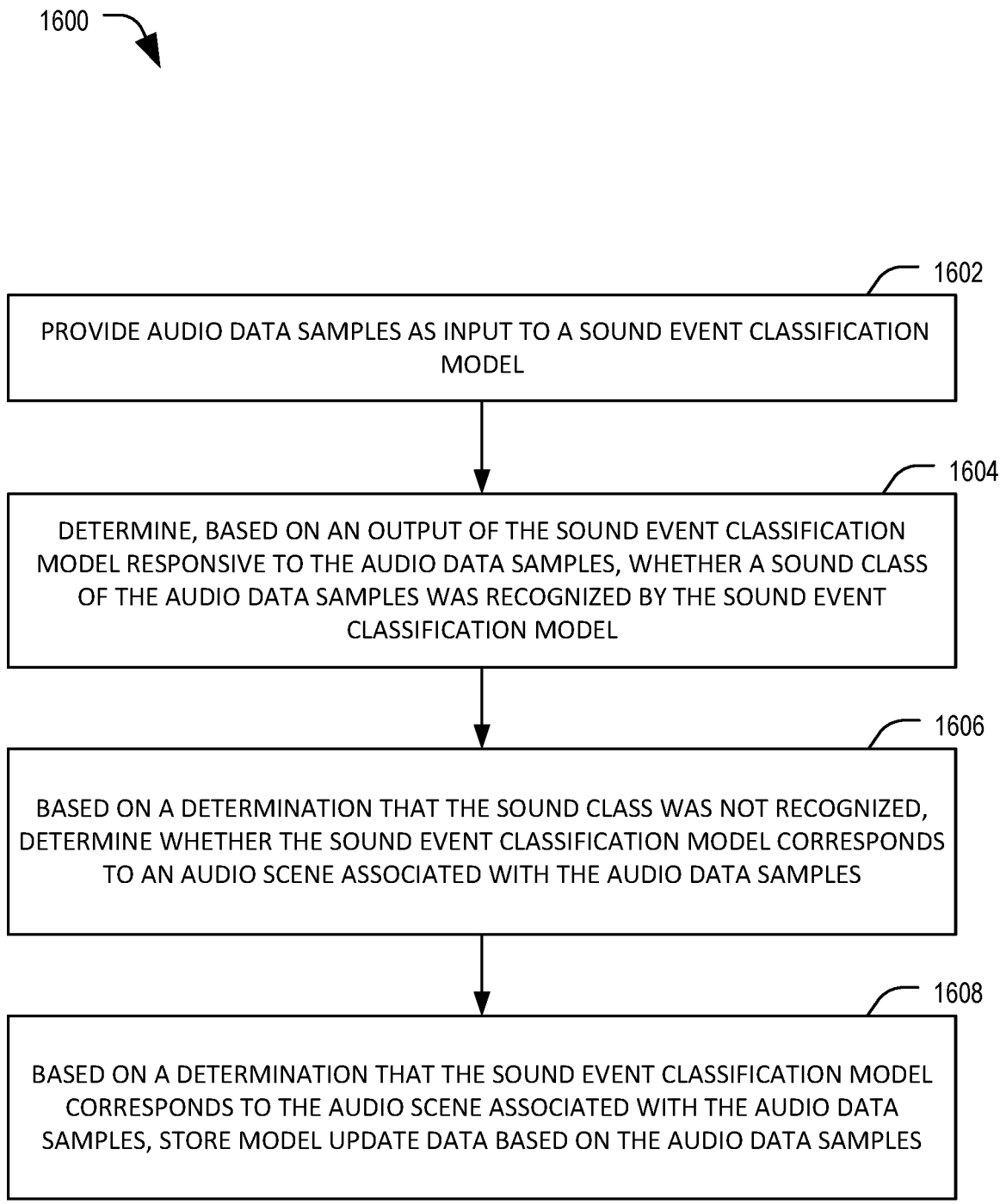

FIG. 16 is a flow chart illustrating an example of a method of operation of the device of FIG. 1.

V. DETAILED DESCRIPTION

Sound event classification models can be trained using machine-learning techniques. For example, a neural network can be trained as a sound event classifier using backpropagation or other machine-learning training techniques. A neural network trained in this manner is referred to herein as a "sound event classification model." A sound event classification model trained in this manner can be small enough (in terms of storage space occupied) and simple enough (in terms of computing resources used during operation) for a portable computing device to store and use the sound event classification model. The process of training a sound event classification model uses significantly more processing resources than are used to perform sound event classification using a sound event classification model. Additionally, the training process uses a large set of labeled training data including many audio data samples for each sound class that the sound event classification model is being trained to detect. It may be prohibitive, in terms of memory utilization or other computing resources, to train a sound event classification model from scratch on a portable computing device or another resource limited computing device. As a result, a user who desires to use a sound event classification model on a portable computing device may be limited to downloading pre-trained sound event classification models onto the portable computing device from a less resource constrained computing device or from a library of pre-trained sound event classification models. Thus, the user has limited customization options.

The disclosed systems and methods use transfer learning techniques to update sound event classification models in a manner that uses significantly fewer computing resources than training sound event classification models from scratch. According to a particular aspect, the transfer learning techniques can be used to update a sound event classification model to account for drift within a sound class or to recognize a new sound class. In this context, "drift" refers to variation within a sound class. For example, a sound event classification model may be able to recognize some examples of the sound class but may not be able to recognize other examples of the sound class. To illustrate, a sound event classification model trained to recognize a car horn sound class may be able to recognize many different types of car horns but may not be able to recognize some examples of car horns. Drift can also occur due to variations in an acoustic environment. To illustrate, the sound event classification model may be trained to recognize the sound of a bass drum played in a concert hall but may not recognize the bass drum if it is played by a marching band in an outdoor parade. The transfer learning techniques disclosed herein facilitate updating a sound event classification model to account for such drift, which enables the sound event classification model to detect a broader range of sounds within a sound class. Because the drift may correspond to sounds that were encountered by a user device but that were unrecognized by the user device, updating the sound event classification model for the user device to accommodate these encountered variations of sound classes enables the user device to more accurately identify specific variations of sound classes that are commonly encountered by that particular user device.

According to a particular aspect, when the sound event classification model is determined to have not recognized a sound class of a sound (based on audio data samples of the sound), a determination is made whether the sound was not recognized due to drift or because the sound event classification model does not recognize sound classes of a type associated with the sound. For example, information distinct from the audio data samples, such as a timestamp, location data, image data, video data, user input data, settings data, other sensor data, etc., is used to determine scene data indicating a sound environment (or audio scene) associated with the audio data samples. The scene data is used to determine whether the sound event classification model corresponds to (e.g., is trained to recognize sound events in) the audio scene. If the sound event classification model corresponds to the audio scene, the audio data samples are saved as model update data and indicated to be drift data. In some aspects, if the sound event classification model does not correspond to the audio scene, the audio data samples are discarded as unknown or saved as model update data and indicated to be associated with an unknown sound class (e.g., unknown data).

Periodically or occasionally (e.g., when initiated by a user or when an update condition is satisfied), the sound event classification model is updated using the model update data. For example, to account for drift data, the sound event classifier can be trained (e.g., further trained, by starting with the already trained sound event classifier) using backpropagation or other similar machine-learning techniques. In this example, the drift data is associated with a label of a sound class already recognized by the sound event classification model, and the drift data and corresponding label are used as labeled training data. Updating the sound event classification model using the drift data can be augmented by adding other examples of the sound class to the labeled training data, such as examples taken from training data originally used to train the sound event classification model. In some aspects, a device automatically (e.g., without user input) updates one or more sound event classification models when drift data is available. Thus, a sound event classification system can automatically adapt to account for drift within a sound class using significantly fewer computing resources that would be used to train the sound event classification model from scratch.

To account for unknown data, the sound event classification model can be trained using more complex transfer learning techniques. For example, when unknown data is available, a user may be queried to indicate whether the user desires to update the sound event classification model. The audio representing the unknown data can be played out to the user, and the user can indicate that the unknown data is to be discarded without updating the sound event classification model, can indicate that the unknown data corresponds to a known sound class (e.g., to reclassify the unknown data as drift data), or can assign a new sound class label to the unknown data. If the user reclassifies the unknown data as drift data, the machine-learning technique(s) used to update the sound event classification model to account for drift data are initiated, as described above.

If the user assigns a new sound class label to the unknown data, the label and the unknown data are used as labeled training data to generate an updated sound event classification model. According to a particular aspect, a transfer learning technique used to update the sound event classification model includes generating a copy of the sound event classifier model that includes an output node associated with the new sound class. The copy of the sound event classifier model is referred to as an incremental model. The transfer learning technique also includes connecting the sound event classification model and the incremental model to one or more adapter networks. The adapter network(s) facilitate generation of a merged output that is based on both the output of the sound event classification model and the output of the incremental model. Audio data samples including the unknown data and one or more audio data samples corresponding to known sound classes (e.g., sound classes that the sound event classifier was previously trained to recognize) are provided to the sound event classification model and the incremental model to generate the merged output. The merged output indicates a sound class assigned to the audio data samples based on analysis by the sound event classification model, the incremental model, and the one or more adapter networks. During training, the merged output is used to update link weights of the incremental model and the adapter network(s). When training is complete, the sound event classifier may be discarded if the incremental model is sufficiently accurate. If the incremental model alone is not sufficiently accurate, the sound event classification model, the incremental model, and the adapter network(s) are retained together and used as a single updated sound event classification model. Thus, the techniques disclosed herein enable customization and updating of sound event classification models in a manner that is less resource intensive (in terms of memory resources, processor time, and power) than training a neural network from scratch. Additional, in some aspects, the techniques disclosed enable automatic updating of sound event classification models to account for drift.

The disclosed systems and methods provide a context-aware system that can detect dataset drift, associate drift data with a corresponding class (e.g., by utilizing available multi-modal inputs), and refine/fine-tune an SEC model utilizing the drift data with little or no supervision and without training a new SEC model from scratch. In some aspects, before refining/fine-tuning the SEC model, the SEC model is trained to recognize multiple variants of a particular sound class, and refining/fine-tuning the SEC model modifies the SEC model to enable the SEC model to recognize an additional variant of the particular sound class.

In some aspects, the disclosed systems and methods may be used for applications that suffer from dataset drift during test. For example, the systems and methods can detect the dataset drift and refine the SEC model without retraining previously learned sound classes from scratch. In some aspects, the disclosed systems and methods may be used to add new sound classes to an existing SEC model (e.g., an SEC model that is already trained for certain sound classes) without re-training the SEC model from scratch, without the need to access all the training data used to train the SEC model initially, and without introducing any performance degradation with respect to the sound classes the SEC model was initially trained to recognize.

In some aspects, the disclosed systems and methods may be used in applications where a continuous learning capability at a low footprint constraint is desirable. In some implementations, the disclosed systems and methods may have access to a database of various detection models (e.g., SEC models) for a diverse range of applications (e.g., various sound environments). In such implementations, an SEC model may be selected, during operation, based on a sound environment, and the SEC model may be loaded and utilized as the source model.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 100 including one or more sensors ("sensor(s) 134 in FIG. 1), which indicates that in some implementations the device 100 includes a single sensor 134 and in other implementations the device 100 includes multiple sensors 134. For ease of reference herein, such features are generally introduced as "one or more" features and are subsequently referred to in the singular or optional plural (generally indicated by terms ending in "(s)") unless aspects related to multiple of the features are being described.

The terms "comprise," "comprises," and "comprising" are used herein interchangeably with "include," "includes," or "including." Additionally, the term "wherein" is used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" refers to two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a block diagram of an example of a device 100 that is configured to generate sound identification data responsive to audio data samples 110 and configured to update a sound event classification model. The device 100 of FIG. 1 includes one or more microphones 104 configured to generate audio signals 106 based on sound 102 detected within an acoustic environment. The microphone(s) 104 are coupled to a feature extractor 108 that generates audio data samples 110 based on the audio signals 106. For example, the audio data samples 110 may include an array or matrix of data elements, with each data element corresponding to a feature detected in the audio signals 106. As a specific example, the audio data samples 110 can correspond to Mel spectrum features extracted from one second of the audio signals 106. In this example, the audio data samples 110 can include a 128×128 element matrix of feature values. In other examples, other audio data sample configurations or sizes can be used.

The audio data samples 110 are provided to a sound event classification (SEC) engine 120. The SEC engine 120 is configured to perform inference operations based on one or more SEC models, such as an SEC model 112. "Inference operations" refer to assigning the audio data samples 110 to a sound class, if the sound class of the audio data samples 110 is recognized by the SEC model 112. For example, the SEC engine 120 may include or correspond to software that implements a machine-learning runtime environment, such as the Qualcomm Neural Processing SDK, which is available from Qualcomm Technologies, Inc. of San Diego, Calif., USA. In a particular aspect, the SEC model 112 is one of a plurality of SEC models (e.g., available SEC models 114) that are available to the SEC engine 120.

In a particular example, each of the available SEC models 114 includes or corresponds to a neural network that is trained as a sound event classifier. To illustrate, the SEC model 112 (as well as each of the other available SEC models 114) may include an input layer, one or more hidden layers, and an output layer. In this example, the input layer is configured to correspond to the array or matrix of values of the audio data samples 110 generated by the feature extractor 108. To illustrate, if the audio data samples 110 include 15 data elements, the input layer may include 15 nodes (e.g., one per data element). The output layer is configured to correspond to the sound classes that the SEC model 112 is trained to recognize. The specific arrangement of the output layer can vary depending on information to be provided as output. As one example, the SEC model 112 may be trained to output an array that includes one bit per sound class, where the output layer performs "one hot encoding" such that all but one of the bits of the output array have a value of zero, and the bit corresponding to a detected sound class has a value of one. Other output schemes can be used to indicate, for example, a value of a confidence metric for each sound class, where the value of the confidence metric indicates a probability estimate that the audio data samples 110 correspond to the respective sound class. To illustrate, if the SEC model 112 is trained to recognize four sound classes, the SEC model 112 may generate output data that includes four values (one per sound class), and each value may indicate a probability estimate that the audio data samples 110 correspond to the respective sound class.

Each of the hidden layers includes a plurality of nodes, and each node is interconnected (via a link) with other nodes in the same layer or in a different layer. Each input link of a node is associated with a link weight. During operation, a node receives input values from other nodes that it is linked to, weights the input values based on corresponding link weights to determine a combined value, and subjects the combined value to an activation function to generate an output value of the node. The output value is provided to one or more other nodes via output links of the node. The nodes may also include bias values that are used to generate the combined value. The nodes can be linked in various arrangements and can include various other features (e.g., memory of prior values) to facilitate processing of particular data. In the case of audio data samples, convolutional neural networks (CNNs) may be used. To illustrate, one or more of the SEC models 112 may include three linked CNNs, and each CNN may include a two-dimensional (2D) convolution layer, a maxpooling layer, and a batch normalization layer. In other implementations, the hidden layers include a different number of CNNs or other layers. Training the neural network includes modifying the link weights to reduce an output error of the neural network.

During operation, the SEC engine 120 may provide the audio data samples 110 as input to a single SEC model (e.g., the SEC model 112), to multiple selected SEC models (e.g., the SEC model 112 and a Kth SEC model 118 of the available SEC models 114), or to each of the SEC models (e.g., to the SEC model 112, a first SEC model 116, the Kth SEC model 118, and any other SEC models of the available SEC models 114). For example, the SEC engine 120 (or another component of the device 100) may select the SEC model 112 from among the available SEC models 114 based on, for example, user input, device settings associated with the device 100, sensor data, a time when the audio data samples 110 are received, or other factors. In this example, the SEC engine 120 may select to use only the SEC model 112 or may select to use two or more of the available SEC models 114. To illustrate, the device settings may indicate that the SEC model 112 and the first SEC model 116 are to be used during a particular time frame. In another example, the SEC engine 120 may provide the audio data samples 110 to each of the available SEC models 114 (e.g., sequentially or in parallel) to generate output from each. In a particular aspect, the SEC models are trained to recognize different sound classes, to recognize the same sound classes in different acoustic environments, or both. For example, the SEC model 112 may be configured to recognize a first set of sound classes and the first SEC model 116 may be configured to recognize a second set of sound classes, where the first set of sound classes is different from the second set of sound classes.

In a particular aspect, the SEC engine 120 determines, based on output of the SEC model 112, whether the SEC model 112 recognized the sound class of the audio data samples 110. If the SEC engine 120 provides the audio data samples 110 to multiple SEC models, the SEC engine 120 may determine, based on output of each of the SEC models, whether any of the SEC models recognized the sound class of the audio data samples 110. If the SEC model 112 (or another of the available SEC models 114) recognized the sound class of the audio data samples 110, the SEC engine 120 generates an output 124 that indicates the sound class 122 of the audio data samples 110. For example, the output 124 may be sent to a display to notify a user of detection of the sound class 122 associated with the sound 102 or may be sent to another device or another component of the device 100 and used to trigger an action (e.g., to send a command to activate lights in response to recognizing the sound of a door shutting).

If the SEC engine 120 determines that the SEC model 112 (and others of the available SEC models 114 that were provided the audio data samples 110) did not recognize the sound class of the audio data samples 110, the SEC engine 120 provides a trigger signal 126 to a drift detector 128. For example, the SEC engine 120 may set a trigger flag in a memory of the device 100. In some implementations, the SEC engine 120 may also provide other data to the drift detector 128. To illustrate, if the SEC model 112 generates a value of a confidence metric for each sound class that the SEC model 112 is trained to recognize, one or more of the values of the confidence metric may be provided to the drift detector 128. For example, if the SEC model 112 is trained to recognize three sound classes, the SEC engine 120 may provide a highest confidence value among three confidence values (one for each of the three sound classes) output by the SEC model 112 to the drift detector 128.

In a particular aspect, the SEC engine 120 determines whether the SEC model 112 recognized the sound class of the audio data samples 110 based on a value of a confidence metric. In this particular aspect, a value of the confidence metric for a particular sound class indicates the probability that the audio data samples 110 are associated with the particular sound class. To illustrate, if the SEC model 112 is trained to recognize four sound classes, the SEC model 112 may generate as output an array that includes four values of the confidence metric, one for each sound class. In some implementations, the SEC engine 120 determines that the SEC model 112 recognized the sound class 122 of the audio data samples 110 if the value of the confidence metric for the sound class 122 is greater than a detection threshold. For example, the SEC engine 120 determines that the SEC model 112 recognized the sound class 122 of the audio data samples 110 if the value of the confidence metric for the sound class 122 is greater than 0.90 (e.g., 90% confidence), 0.95 (e.g., 95% confidence), or some other value of the detection threshold. In some implementations, the SEC engine 120 determines that the SEC model 112 did not recognize a sound class of the audio data samples 110 if the value of the confidence metric for each sound class that the SEC model 112 is trained to recognize is less than the detection threshold. For example, the SEC engine 120 determines that the SEC model 112 did not recognize the sound class 122 of the audio data samples 110 if each value of the confidence metric is less than 0.90 (e.g., 90% confidence), 0.95 (e.g., 95% confidence), or some other value of the detection threshold.

The drift detector 128 is configured to determine whether the SEC model 112 that was not able to recognize the sound class of the audio data samples 110 corresponds to an audio scene 142 associated with the audio data samples 110. In the example illustrated in FIG. 1, a scene detector 140 is configured to receive scene data 138 and to use the scene data 138 to determine the audio scene 142 associated with the audio data samples 110. In a particular aspect, the scene data 138 is generated based on settings data 130 indicating one or more device settings associated with the device 100, output of a clock 132, sensor data from one or more sensors 134, input received via an input device 136, or a combination thereof. In some aspects, the scene detector 140 uses different information to determine the audio scene 142 than the SEC engine 120 uses to select the SEC model 112. To illustrate, if the SEC engine 120 selects the SEC model 112 based on time of day, the scene detector 140 may use position sensor data from a position sensor of the sensor(s) 134 to determine the audio scene 142. In some aspects, the scene detector 140 uses at least some of the same information that the SEC engine 120 uses to select the SEC model 112 and uses additional information. To illustrate, if the SEC engine 120 selects the SEC model 112 based on time of day and the settings data 130, the scene detector 140 may use the position sensor data and the settings data 130 to determine the audio scene 142. Thus, the scene detector 140 uses a different audio scene detection mode than is used by the SEC engine 120 to select the SEC model 112.

In a particular implementation, the scene detector 140 is a neural network that is trained to determine the audio scene 142 based on the scene data 138. In other implementations, the scene detector 140 is a classifier that trained using a different machine-learning technique. For example, the scene detector 140 may include or correspond to a decision tree, a random forest, a support vector machine, or another classifier that is trained to generate output indicating the audio scene 142 based on the scene data 138. In still other implementations, the scene detector 140 uses heuristics to determine the audio scene 142 based on the scene data 138. In yet other implementations, the scene detector 140 uses a combination of artificial intelligence and heuristics to determine the audio scene 142 based on the scene data 138. For example, the scene data 138 may include image data, video data, or both, and the scene detector 140 may include an image recognition model that is trained using a machine-learning technique to detect particular objects, motions, backgrounds, or other image or video information. In this example, output of the image recognition model may be evaluated via one or more heuristics to determine the audio scene 142.

The drift detector 128 compares the audio scene 142 indicated by the scene detector 140 to information descriptive of the SEC model 112 to determine whether the SEC model 112 is associated with the audio scene 142 of the audio data samples 110. If the drift detector 128 determines that the SEC model 112 is associated with the audio scene 142 of the audio data samples 110, the drift detector 128 causes drift data 144 to be stored as model update data 148. In a particular implementation, the drift data 144 includes the audio data samples 110 and a label, where the label identifies the SEC model 112, indicates a sound class associated with the audio data samples 110, or both. If the drift data 144 indicates a sound class associated with the audio data samples 110, the sound class may be selected based on a highest value of the confidence metric generated by the SEC model 112. As an illustrative example, if the SEC engine 120 uses a detection threshold of 0.90, and the highest value of the confidence metric output by the SEC model 112 is 0.85 for a particular sound class, the SEC engine 120 determines that the sound class of the audio data samples 110 was not recognized and sends the trigger signal 126 to the drift detector 128. In this example, if the drift detector 128 determines that the SEC model 112 corresponds to the audio scene 142 of the audio data samples 110, the drift detector 128 stores that the audio data samples 110 as drift data 144 associated with the particular sound class. In a particular aspect, metadata associated with the SEC models 114 includes information specifying an audio scene or audio scenes associated with each SEC model 114. For example, the SEC model 112 may be configured to detect sound events in a user's home, in which case the metadata associated with the SEC model 112 may indicate that the SEC model 112 is associate with a "home" audio scene. In this example, if the audio scene 142 indicates that the device 100 is at a home location (e.g., based on position information, user input, detection of a home wireless network signal, image or video data representing home locations, etc.), the drift detector 128 determines that the SEC model 112 corresponds to the audio scene 142.

In some implementations, the drift detector 128 also causes some audio data samples 110 to be stored as model update data 148 and designated as unknown data 146. As a first example, the drift detector 128 may store the unknown data 146 if the drift detector 128 determines that the SEC model 112 does not correspond to the audio scene 142 of the audio data samples 110. As a second example, the drift detector 128 may store the unknown data 146 if the value of the confidence metric output by the SEC model 112 fails to satisfy a drift threshold. In this example, the drift threshold is less than the detection threshold used by the SEC engine 120. For example, if the SEC engine 120 uses a detection threshold of 0.95, the drift threshold may have a value of 0.80, of 0.75, or some other value less than 0.95. In this example, if the highest value of the confidence metric for the audio data samples 110 is less than the drift threshold, the drift detector 128 determines that the audio data samples 110 belong to a sound class that the SEC model 112 is not trained to recognize, and designates the audio data samples 110 as unknown data 146. In a particular aspect, the drift detector 128 only stores the unknown data 146 if the drift detector 128 determines that the SEC model 112 corresponds to the audio scene 142 of the audio data samples 110. In another particular aspect, the drift detector 128 stores the unknown data 146 independently of whether the drift detector 128 determines that the SEC model 112 corresponds to the audio scene 142 of the audio data samples 110.

After the model update data 148 is stored, a model updater 152 can access the model update data 148 and use the model update data 148 to update one of the available SEC models 114 (e.g., the SEC model 112). For example, each entry of the model update data 148 indicates an SEC model with which the entry is associated, and the model updater 152 uses the entry as training data to update the corresponding SEC model. In a particular aspect, the model updater 152 updates an SEC model when an update criterion is satisfied or when a model update is initiated by a user or another party (e.g., a vendor of the device 100, the SEC engine 120, the SEC models 114, etc.). The update criterion may be satisfied when a particular number of entries are available in the model update data 148, when a particular number of entries for a particular SEC model are available in the model update data 148, when a particular number of entries for a particular sound class are available in the model update data 148, when a particular amount of time has passed since a prior update, when other updates occur (e.g., when a software update associated with the device 100 occurs), or based on occurrence of another event.

The model updater 152 uses the drift data 144 as labeled training data to update training of the SEC model 112 using backpropagation or a similar machine-learning optimization process. For example, the model updater 152 provides audio data samples from the drift data 144 of the model update data 148 as input to the SEC model 112, determines a value of an error function (also referred to as a loss function) based on output of the SEC model 112 and a label associate with the audio data samples (as indicated in the drift data 144 stored by the drift detector 128), and determines updated link weights for the SEC model 112 using a gradient descent operation (or some variant thereof) or another machine-learning optimization process.

The model updater 152 may also provide other audio data samples (in addition to audio data samples of the drift data 144) to the SEC model 112 during the update training. For example, the model update data 148 may include one or more known audio data samples (such as a subset of the audio data samples originally used to train the SEC model 112), which may reduce the chances of the update training causing the SEC model 112 to forget previous training (where "forgetting" here refers to losing reliability for detecting sound classes that the SEC model 112 was previously trained to recognize). Since the sound class associated with the audio data samples of the drift data 144 is indicated by the drift detector 128, update training to account for drift can be accomplished automatically (e.g., without user input). As a result, functionality of the device 100 (e.g., accuracy in recognizing sound classes) can improve over time without user intervention and using fewer computing resources than would be used to generate a new SEC model from scratch. A particular example of a transfer learning process that the model updater 152 can use to update the SEC model 112 based on the drift data 144 is described with reference to FIG. 2.

In some aspects, the model updater 152 can also use the unknown data 146 of the model update data 148 to update training of the SEC model 112. For example, periodically or occasionally, such as when the update criterion is satisfied, the model updater 152 may prompt a user to ask the user to label the sound class of the entries of the unknown data 146 in the model update data 148. If the user choses to label the sound class of an entry of unknown data 146, the device 100 (or another device) may playout sound corresponding to audio data samples of the unknown data 146. The user can provide one or more labels 150 (e.g., via the input device 136) identifying a sound class of the audio data samples. If the sound class indicated by the user is a sound class that the SEC model 112 is trained to recognize, then the unknown data 146 is reclassified as drift data 144 associated with the user-specified sound class and the SEC model 112. Depending on the configuration of the model updater 152, if the sound class indicated by the user is a sound class that the SEC model 112 is not trained to recognize (e.g., is a new sound class), the model updater 152 may discard the unknown data 146, send the unknown data 146 and the user-specified sound class to another device for use to generate a new or updated SEC model, or may use the unknown data 146 and the user-specified sound class to update the SEC model 112. A particular example of a transfer learning process that the model updater 152 can use to update the SEC model 112 based on the unknown data 146 and the user-specified sound class is described with reference to FIG. 3.

An updated SEC model 154 generated by the model updater 152 is added to the available SEC models 114 to make the updated SEC model 154 available to evaluate audio data samples 110 received after the updated SEC model 154 is generated. Thus, the set of available SEC models 114 that can be used to evaluate sounds is dynamic. For example, one or more of the available SEC models 114 can be automatically updated to account for drift data 144. Additionally, one or more of the available SEC models 114 can be updated to account for unknown sound classes using transfer learning operations that use fewer computing resources (e.g., memory, processing time, and power) than training a new SEC model from scratch.

Figure 2:
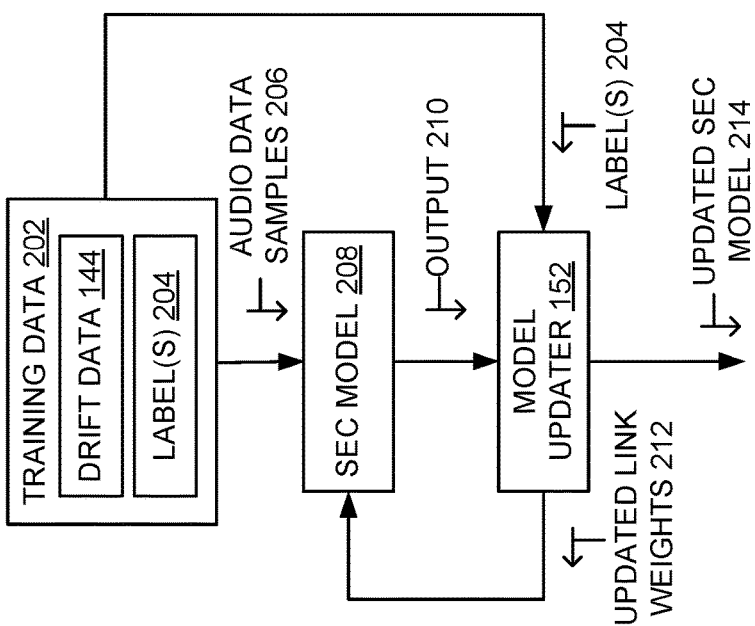
FIG. 2 is a diagram that illustrates aspects of updating a sound event classification model to account for drift according to a particular example.

FIG. 2 is a diagram that illustrates aspects of updating an SEC model 208 to account for drift according to a particular example. The SEC model 208 of FIG. 2 includes or corresponds to a particular one of the available SEC models 114 of FIG. 1 that is associated with the drift data 144. For example, if the SEC engine 120 generated the trigger signal 126 in response to output of the SEC model 112, the drift data 144 is associated with the SEC model 112, and the SEC model 208 corresponds to or includes the SEC model 112. As another example, if the SEC engine 120 generated the trigger signal 126 in response to output of the Kth SEC model 118, the drift data 144 is associated with the Kth SEC model 118, and the SEC model 208 corresponds to or includes the Kth SEC model 118.

In the example illustrated in FIG. 2, training data 202 is used to update the SEC model 208. The training data 202 includes the drift data 144 and one or more labels 204. Each entry of the drift data 144 includes audio data samples (e.g., audio data samples 206) and is associated with a corresponding label of the label(s) 204. The audio data samples of an entry of the drift data 144 include a set of values representing features extracted from or determined based on a sound that was not recognized by the SEC model 208. The label 204 corresponding to an entry of the drift data 144 identifies a sound class to which the sound is expected to belong. As an example, the label 204 corresponding to an entry of the drift data 144 may be assigned by the drift detector 128 of FIG. 1 in response to determining that the SEC model 208 corresponds to the audio scene in which the audio data samples were generated. In this example, the drift detector 128 may assign the audio data samples to the sound class that was associated, in the output of the SEC model 208, with a highest confidence metric value.

In FIG. 2, audio data samples 206 corresponding to a sound are provided to the SEC model 208, and the SEC model 208 generates output 210 that indicates a sound class to which the audio data samples 206 are assigned, one or more values of a confidence metric, or both. The model updater 152 uses the output 210 and the label 204 corresponding to the audio data samples 206 to determine updated link weights 212 for the SEC model 208. The SEC model 208 is updated based on the updated link weights 212, and the training process is repeated iteratively until a training termination condition is satisfied. During training, each of the entries of the drift data 144 may be provided to the SEC model 208 (e.g., one entry per iteration). Additionally, in some implementations, other audio data samples (e.g., audio data samples previously used to train the SEC model 208) may also be provided to the SEC model 208 to reduce the chance of the SEC model 208 forgetting prior training.

The training termination condition may be satisfied when all of the drift data 144 has been provided to the SEC model 208 at least once, after a particular number of training iterations have been performed, when a convergence metric satisfies a convergence threshold, or when some other condition indicative of the end of training is met. When the training termination condition is satisfied, the model updater 152 stores the updated SEC model 214, where the updated SEC model 214 corresponds to the SEC model 208 with link weights based on the updated link weights 212 applied during training.

Figure 3:
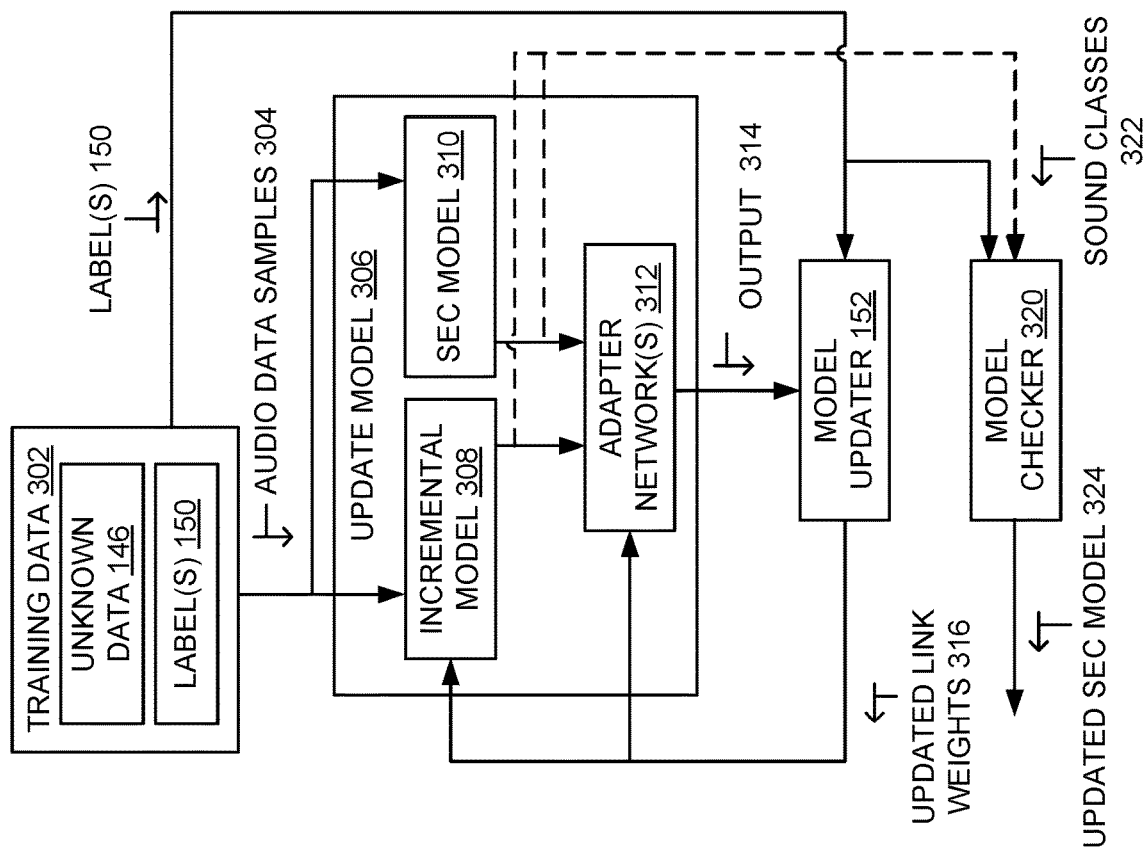
FIG. 3 is a diagram that illustrates aspects of updating a sound event classification model to account for new sound classes according to a particular example.

FIG. 3 is a diagram that illustrates aspects of updating an SEC model 310 to account for unknown data according to a particular example. The SEC model 310 of FIG. 3 includes or corresponds to a particular one of the available SEC models 114 of FIG. 1 that is associated with the unknown data 146. For example, if the SEC engine 120 generated the trigger signal 126 in response to output of the SEC model 112, the unknown data 146 is associated with the SEC model 112, and the SEC model 310 corresponds to or includes the SEC model 112. As another example, if the SEC engine 120 generated the trigger signal 126 in response to output of the Kth SEC model 118, the unknown data 146 is associated with the Kth SEC model 118, and the SEC model 310 corresponds to or includes the Kth SEC model 118.

In the example of FIG. 3, the model updater 152 generates an update model 306. The update model 306 includes the SEC model 310 that is to be updated, an incremental model 308, and one or more adapter networks 312. The incremental model 308 is a copy of the SEC model 310 with a different output layer than the SEC model 310. In particular, the output layer of the incremental model 308 includes more output nodes than the output layer of the SEC model 310. For example, the output layer of the SEC model 310 includes a first count of nodes (e.g., N nodes, where N is a positive integer corresponding to the number of sound classes that the SEC model 310 is trained to recognize), and the output layer of the incremental model 308 includes a second count of nodes (e.g., N+M nodes, where M is a positive integer corresponding to a number of new sound classes that an updated SEC model 324 is to be trained to recognized that the SEC model 310 is not trained to recognize). The first count of nodes corresponds to the count of sound classes of a first set of sound classes that the SEC model 310 is trained to recognize (e.g., the first set of sound classes includes N distinct sound classes that the SEC model 310 can recognize), and the second count of nodes corresponds to the count of sound classes of a second set of sound classes that the updated SEC model 324 is to be trained to recognize (e.g., the second set of sound classes includes N+M distinct sound classes that the updated SEC model 324 is to be trained to recognize). The second set of sound classes includes the first set of sound classes (e.g., N classes) plus one or more additional sound classes (e.g., M classes). Model parameters (e.g., link weights) of the incremental model 308 are initialized to be equal to model parameters of the SEC model 310.

The adapter network(s) 312 include a neural adapter and a merger adapter. The neural adapter includes one or more adapter layers configured to receive input from the SEC model 310 and to generate output that can be merged with the output of the incremental model 308. For example, the SEC model 310 generates a first output corresponding to the first count of classes of the first set of sound classes. In a particular aspect, the first output includes one data element for each node of the output layer of the SEC model 310 (e.g., N data elements). In contrast, the incremental model 308 generates a second output corresponding to the second count of classes of the second set of sound classes. For example, the second output includes one data element for each node of the output layer of the incremental model 308 (e.g., N+M data elements). In this example, the adapter layer(s) of the adapter network(s) 312 receive the output of the SEC model 310 as input and generate an output having the second count of data elements (e.g., N+M). In a particular example, the adapter layer(s) of the adapter network(s) 312 include two fully connected layers (e.g., an input layer including N nodes and an output layer including N+M nodes, with each node of the input layer connected to every node of the output layer).

The merger adapter of the adapter network(s) 312 is configured to generate output 314 of the update model 306 by merging the output of the adapter layer(s) and the output of the incremental model 308. For example, the merger adapter combines the output of the adapter layer(s) and the output of the incremental model 308 in an element-by-element manner to generate a combined output and applies an activation function (such as a sigmoid function) to the combined output to generate the output 314. The output 314 indicates a sound class to which the audio data samples 304 are assigned by the update model 306, one or more confidence metric values determined by the update model 306, or both.

The model updater 152 uses the output 314 and a label 150 corresponding to the audio data samples 304 to determine updated link weights 316 for the incremental model 308, the adapter network(s) 312, or both. Link weights of the SEC model 310 are unchanged during training. The training process is repeated iteratively until a training termination condition is satisfied. During training, each of the entries of the unknown data 146 may be provided to the update model 306 (e.g., one entry per iteration). Additionally, in some implementations, other audio data samples (e.g., audio data samples previously used to train the SEC model 310) may also be provided to the update model 306 to reduce the chance of the incremental model 308 forgetting prior training of the SEC model 310.

The training termination condition may be satisfied when all of the unknown data 146 has been provided to the update model 306 at least once, after a particular number of training iterations have been performed, when a convergence metric satisfies a convergence threshold, or when some other condition indicative of the end of training is met. When the training termination condition is satisfied, a model checker 320 selects the updated SEC model 324 from between the incremental model 308 and the update model 306 (e.g., the combination of the SEC model 310, the incremental model 308, and the adapter network(s) 312).

In a particular aspect, the model checker 320 selects the updated SEC model 324 based on an accuracy of sound classes 322 assigned by the incremental model 308 and an accuracy of the sound classes 322 assigned by the SEC model 310. For example, the model checker 320 may determine an F1-score for the incremental model 308 (based on the sound classes 322 assigned by the incremental model 308) and an F1-score of the SEC model 310 (based on the sound classes 322 assigned by the SEC model 310). In this example, if the value of the F1-score of incremental model 308 is greater than or equal to the value of the F1-score of the SEC model 310, the model checker 320 selects the incremental model 308 as the updated SEC model 324. In some implementations, the model checker 320 selects the incremental model 308 as the updated SEC model 324 if the value of the F1-score of the incremental model 308 is greater than or equal to the value of the F1-score of the SEC model 310 (or is less than the value of the F1-score of the SEC model 310 by less than a threshold amount). If the value of the F1-score of incremental model 308 is less than the value of the F1-score for the SEC model 310 (or is less than the value of the F1-score for the SEC model 310 by more than the threshold amount), the model checker 320 selects the update model 306 as the updated SEC model 324. If the incremental model 308 is selected as the updated SEC model 324, the SEC model 310, the adapter network(s) 312, or both may be discarded.

In some implementations, the model checker 320 is omitted or integrated with the model updater 152. For example, after training the update model 306, the update model 306 can be stored as the updated SEC model 324 (e.g., with no selection between the update model 306 and the incremental model 308). As example, while training the update model 306, the model updater 152 can determine an accuracy metric for the incremental model 308. In this example, the training termination condition may be based on the accuracy metric for the incremental model 308 such that after training, the incremental model 308 is stored as the updated SEC model 324 (e.g., with no selection between the update model 306 and the incremental model 308).

Utilizing the transfer learning techniques described with reference to FIG. 3, the model checker 320 enables the device 100 of FIG. 1 to update an SEC model to recognize a previously unknown sound class. Additionally, the transfer learning techniques described use significantly less computer resources (e.g., memory, processing time, and power) than would be used to train an SEC model from scratch to recognize the previously unknown sound class.

In some implementations, the operations described with reference to FIG. 2 (e.g., generating the updated SEC model 214 based on the drift data 144) are performed at the device 100 of FIG. 1, and the operations described with reference to FIG. 3 (e.g., generating the updated SEC model 324 based on the unknown data 146) are performed at different device (such as a remote computing device 618 of FIG. 6). To illustrate, the unknown data 146 and label(s) 150 can be captured at the device 100 and transmitted to a second device that has more available computing resources. In this example, the second device generates the updated SEC model 324 and the device 100 downloads or receives a transmission or data representing the updated SEC model 324 from the second device. Generating the updated SEC model 324 based on the unknown data 146 is a more resource intensive process (e.g., uses more memory, power, and processor time) than generating the updated SEC model 214 based on the drift data 144. Thus, dividing operations described with reference to FIG. 2 and the operations described with reference to FIG. 3 among different devices can conserve resources of the device 100.

Figure 4:
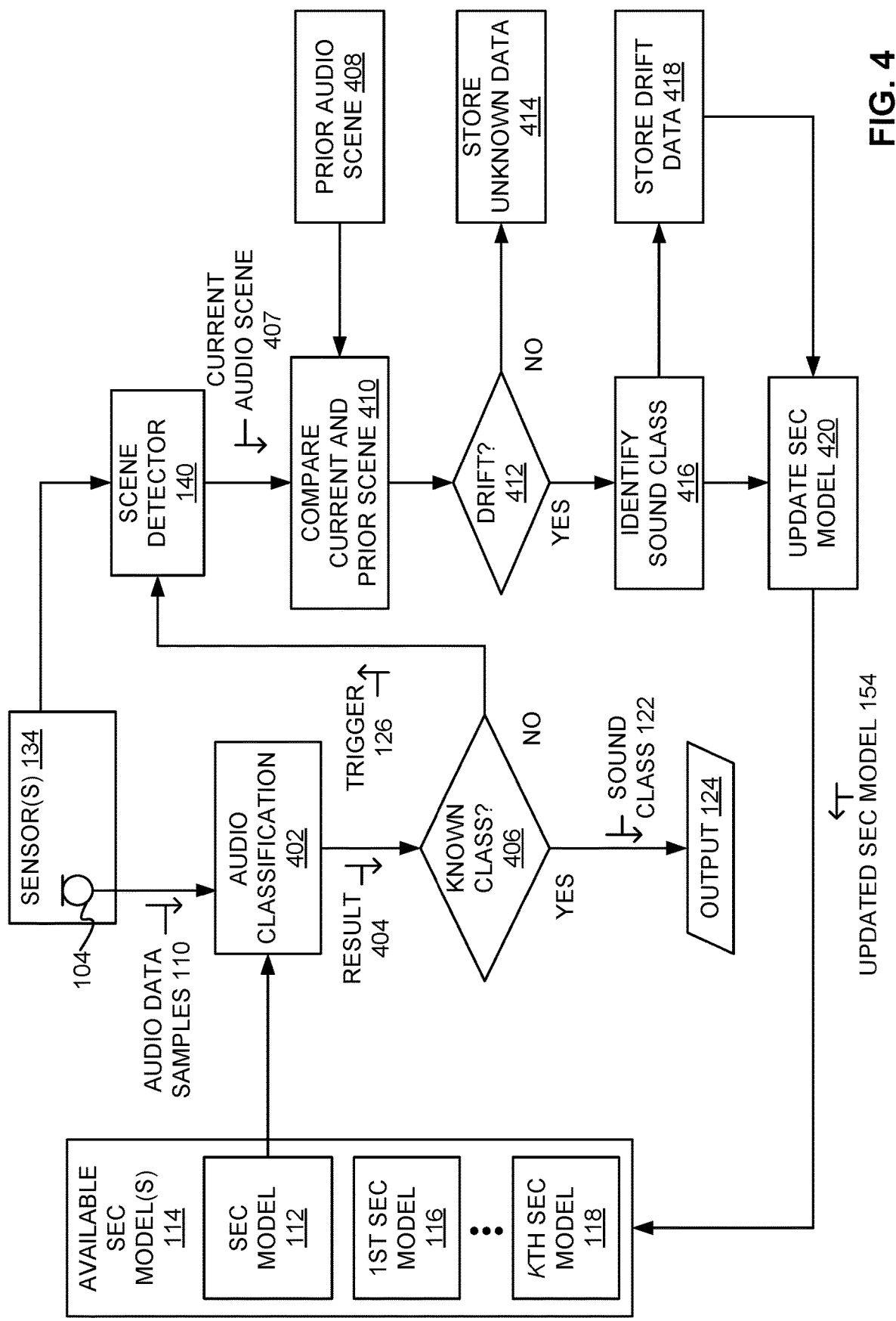
FIG. 4 is a diagram illustrating a particular example of operation of the device of FIG. 1.

FIG. 4 is a diagram illustrating a particular example of operation of the device of FIG. 1. FIG. 4 illustrates an implementation in which a determination of whether an active SEC model (e.g., the SEC model 112) corresponds to an audio scene in which audio data samples 110 are captured is based on comparing a current audio scene to a prior audio scene.

In FIG. 4, audio data captured by the microphone(s) 104 is used to generate the audio data samples 110. The audio data samples 110 are used to perform audio classification

402. For example, one or more of the available SEC models 114 is used as an active SEC model by the SEC engine 120 of FIG. 1. In a particular aspect, the active SEC model is selected from among the available SEC models 114 based on an audio scene indicated by the scene detector 140 during a prior sampling period, which is also referred to as a prior audio scene 408.

Audio classification 402 generates a result 404 based on analysis of the audio data samples 110 using the active SEC model. The result 404 may indicate a sound class associated with the audio data samples 110, a probability that the audio data samples 110 correspond to a particular sound class, or that a sound class of the audio data samples 110 is unknown. If the result 404 indicates that the audio data samples 110 correspond to a known sound class, a decision is made, at block 406, to generate an output 124 indicating the sound class 122 associated with the audio data samples 110. For example, the SEC engine 120 of FIG. 1 may generate the output 124.

If the result 404 indicates that the audio data samples 110 do not correspond to a known sound class, a decision is made, at block 406, to generate the trigger 126. The trigger 126 activates a drift detection scheme, which in FIG. 4 includes causing the scene detector 140 to identify the current audio scene 407 based on data from the sensor(s) 134.

The current audio scene 407 is compared, at block 410, to the prior audio scene 408 to determine whether an audio scene change has occurred since the active SEC model was selected. At block 412, a determination is made whether the sound class of the audio data samples 110 was not recognized due to drift. For example, if the current audio scene 407 does not correspond to the prior audio scene 408, the determination at block 412 is that drift was not the cause of the sound class of the audio data samples 110 not being recognized. In this circumstance, the audio data samples 110 may be discarded or, at block 414, stored as unknown data.

If the current audio scene 407 corresponds to the prior audio scene 408, the determination at block 412 is that the sound class of the audio data samples 110 was not recognized due to drift because the active SEC model corresponds to the current audio scene 407. In this circumstance, the sound class that has drifted is identified, at block 416, and the audio data samples 110 and an identifier of the sound class are stored as drift data, at block 418.

When sufficient drift data is stored, the SEC model is updated, at block 420, to generate the updated SEC model 154. The updated SEC model 154 is added to the available SEC models 114. In some implementations, the updated SEC model 154 replaces the active SEC model that generated the result 404.

Figure 5:
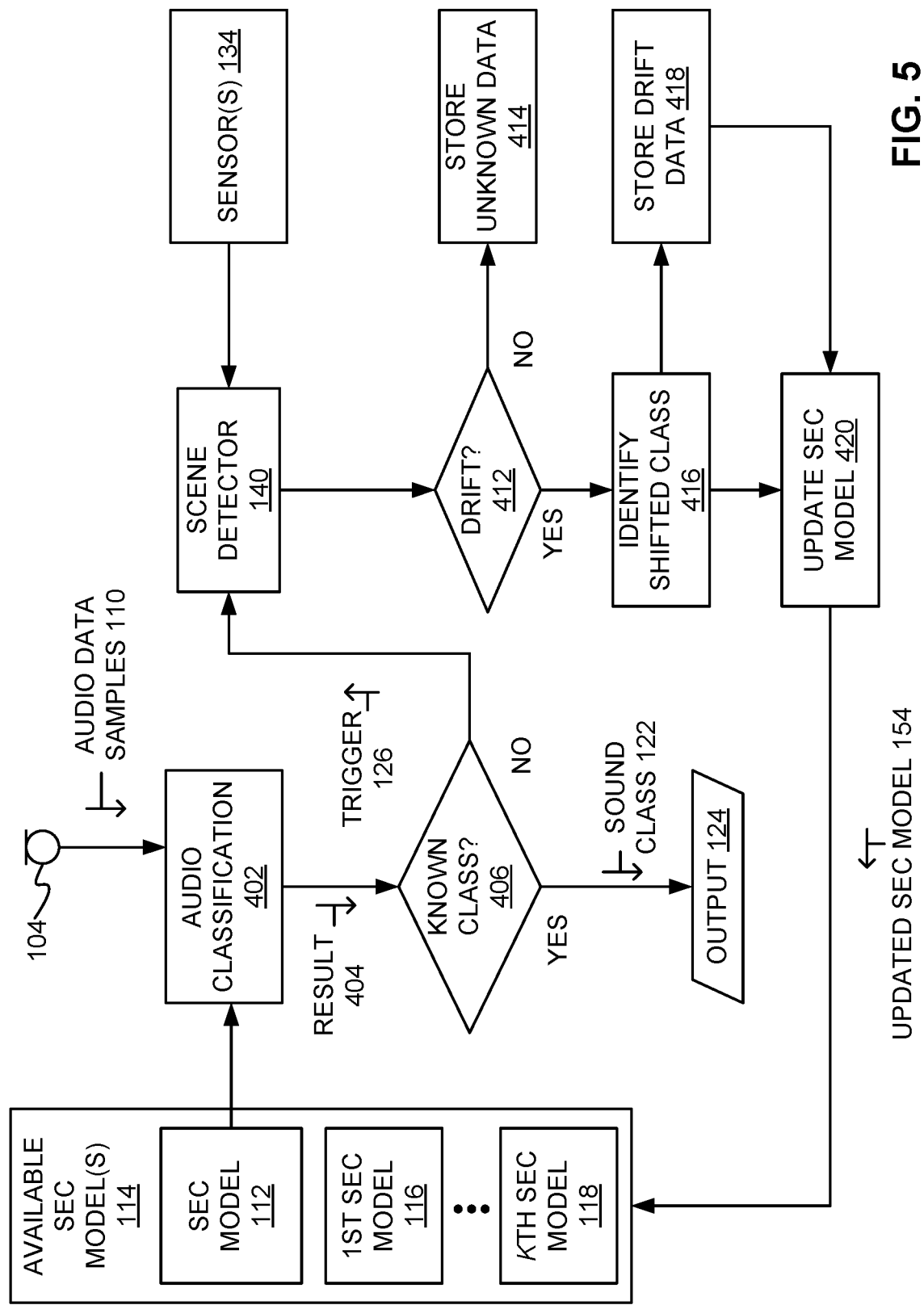
FIG. 5 is a diagram illustrating another particular example of operation of the device of FIG. 1.

FIG. 5 is a diagram illustrating another particular example of operation of the device of FIG. 1. FIG. 5 illustrates an implementation in which a determination of whether an active SEC model (e.g., SEC model 112) corresponds to an audio scene in which audio data samples 110 are captured is based on comparing a current audio scene to information descriptive of the active SEC model.

In FIG. 5, audio data captured by the microphone(s) 104 is used to generate the audio data samples 110. The audio data samples 110 are used to perform audio classification 402. For example, one or more of the available SEC models 114 is used as an active SEC model by the SEC engine 120 of FIG. 1. In a particular aspect, the active SEC model is selected from among the available SEC models 114. In some implementations, an ensemble of the available SEC models 114 is used rather than selecting one or more of the available SEC models 114 as an active SEC model.

The audio classification 402 generates a result 404 based on analysis of the audio data samples 110 using one or more of the available SEC model 114. The result 404 may indicate a sound class associated with the audio data samples 110, a probability that the audio data samples 110 correspond to a particular sound class, or that a sound class of the audio data samples 110 is unknown. If the result 404 indicates that the audio data samples 110 correspond to a known sound class, a decision is made, at block 406, to generate an output 124 indicating the sound class 122 associated with the audio data samples 110. For example, the SEC engine 120 of FIG. 1 may generate the output 124.

If the result 404 indicates that the audio data samples 110 do not correspond to a known sound class, a decision is made, at block 406, to generate the trigger 126. The trigger 126 activates a drift detection scheme, which in FIG. 5 includes causing the scene detector 140 to identify the current audio scene based on data from the sensor(s) 134 and to determine whether the current audio scene corresponds to the SEC model that generated the result 404 that caused the trigger 126 to be sent.

At block 412, a determination is made whether the sound class of the audio data samples 110 was not recognized due to drift. For example, if the current audio scene does not correspond to the SEC model that generated the result 404, the determination at block 412 is that drift was not the cause of the sound class of the audio data samples 110 not being recognized. In this circumstance, the audio data samples 110 may be discarded or, at block 414, stored as unknown data.

If the current audio scene corresponds to the SEC model that generated the result 404, the determination at block 412 is that the sound class of the audio data samples 110 was not recognized due to drift. In this circumstance, the sound class that has drifted is identified, at block 416, and the audio data samples 110 and an identifier of the sound class are stored as drift data, at block 418.

When sufficient drift data is stored, the SEC model is updated, at block 420, to generate the updated SEC model 154. The updated SEC model 154 is added to the available SEC models 114. In some implementations, the updated SEC model 154 replaces the active SEC model that generated the result 404.

FIG. 6 a block diagram illustrating a particular example of the device 100 of FIG. 1. In FIG. 6, the device 100 is configured to use the SEC models 114 to generate sound identification data (e.g., the output 124 of FIG. 1) responsive to input of audio data samples (e.g., the audio data samples 110 of FIG. 1). Additionally, the device 100 of FIG. 6 is configured to update the one or more of the SEC models 114 based on the model update data 148. For example, the device 100 is configured to update the SEC models 114 using the drift data 144 as described with reference to FIG. 2, is configured to update the SEC models 114 using the unknown data 146 as described with reference to FIG. 3, or both. In some implementations, a remote computing device 618 updates the SEC models 114 in some circumstances. To illustrate, the device 100 may update the SEC models 114 using the drift data 144, and the remote computing device 618 may update the SEC models 114 using the unknown data 146. In various implementations, the device 100 may have more or fewer components than illustrated in FIG. 6.

In a particular implementation, the device 100 includes a processor 604 (e.g., a central processing unit (CPU)). The device 100 may include one or more additional processor(s) 606 (e.g., one or more digital signal processors (DSPs)). The processor 604, the processor(s) 606, or both, may be configured to generate sound identification data, to update the SEC model 114, or both. For example, in FIG. 6, the processor(s) 606 include the SEC engine 120. The SEC engine 120 is configured to analyze audio data samples using one or more of the SEC models 114.

In FIG. 6, the device 100 also includes a memory 608 and a CODEC 624. The memory 608 stores instructions 660 that are executable by the processor 604, or the processor(s) 606, to implement one or more operations described with reference to FIGS. 1-5. In an example, the instructions 660 include or correspond to the feature extractor 108, the SEC engine 120, the scene detector 140, the drift detector 128, the model updater 152, the model checker 320, or a combination thereof. The memory 608 may also store the settings data 130, the SEC models 114, and the model update data 148.

In FIG. 6, speaker(s) 622 and the microphone(s) 104 may be coupled to the CODEC 624. In a particular aspect, the microphone(s) 104 are configured to receive audio representing an acoustic environment associated with the device 100 and to generate audio signals that the feature extractor uses to generate audio data samples. In the example illustrated in FIG. 6, the CODEC 624 includes a digital-to-analog converter (DAC 626) and an analog-to-digital converter (ADC 628). In a particular implementation, the CODEC 624 receives analog signals from the microphone(s) 104, converts the analog signals to digital signals using the ADC 628, and provides the digital signals to the processor(s) 606. In a particular implementation, the processor(s) 606 provide digital signals to the CODEC 624, and the CODEC 624 converts the digital signals to analog signals using the DAC 626 and provides the analog signals to the speaker(s) 622.

In FIG. 6, the device 100 also includes an input device 136. The device 100 may also include a display 620 coupled to a display controller 610. In a particular aspect, the input device 136 includes a sensor, a keyboard, a pointing device, etc. In some implementations, the input device 136 and the display 620 are combined in a touchscreen or similar touch or motion sensitive display. The input device 136 can be used to provide a label associated with the unknown data 146 to generate the training data 302. The input device 136 can also be used to initiate a model update operation, such as to start the model update process described with reference to FIG. 2, or the model update process described with reference to FIG. 3. In some implementations, the input device 136 can also, or alternatively, be used to select a particular SEC model of the available SEC models 114 to be used by the SEC engine 120. In a particular aspect, the input device 136 can be used to configure the settings data 130, which may be used to select an SEC model to be used by the SEC engine 120, to determine an audio scene 142, or both. The display 620 can be used to display results of analysis by one of the SEC models (e.g., the output 124 of FIG. 1), to display a prompt to the user to provide a label associated with unknown data 146, or both.

In some implementations, the device 100 also includes a modem 612 coupled to a transceiver 614. In FIG. 6, the transceiver 614 is coupled to an antenna 616 to enable wireless communication with other devices, such as the remote computing device 618. In other examples, the transceiver 614 is also, or alternatively, coupled to a communication port (e.g., an ethernet port) to enable wired communication with other devices, such as the remote computing device 618.

In FIG. 6, the device 100 includes the clock 132 and the sensors 134. As specific examples, the sensors 134 include one or more cameras 650, one or more position sensors 652, the microphone(s) 104, other sensor(s) 654, or a combination thereof.

In a particular aspect, the clock 132 generates a clock signal that can be used to assign a timestamp to particular audio data samples to indicate when particular audio data samples were received. In this aspect, the SEC engine 120 can use the timestamp to select a particular SEC model 114 to use to analyze the particular audio data samples. Additionally or alternatively, the timestamp can be used by the scene detector 140 to determine the audio scene 142 associated with the particular audio data samples.

In a particular aspect, the camera(s) 650 generate image data, video data, or both. The SEC engine 120 can use the image data, the video data, or both, to select a particular SEC model 114 to use to analyze audio data samples. Additionally or alternatively, the image data, the video data, or both, can be used by the scene detector 140 to determine the audio scene 142 associated with the particular audio data samples. For example, the particular SEC model 114 can be designated for outdoor use, and the image data, the video data, or both, may be used to confirm that the device 100 is located in an outdoor environment.

In a particular aspect, the position sensor(s) 652 generate position data, such as global position data indicating a location of the device 100. The SEC engine 120 can use the position data to select a particular SEC model 114 to use to analyze audio data samples. Additionally or alternatively, the position data can be used by the scene detector 140 to determine the audio scene 142 associated with the particular audio data samples. For example, the particular SEC model 114 can be designated for use at home, and the position data may be used to confirm that the device 100 is located at a home location. The position sensor(s) 652 may include a receiver for a satellite-based positioning system, a receiver for a local positioning system receiver, an inertial navigation system, a landmark-based positioning system, or a combination thereof.

The other sensor(s) 654 can include, for example, an orientation sensor, a magnetometer, a light sensor, a contact sensor, a temperature sensor, or any other sensor that is coupled to or included within the device 100 and that can be used to generate scene data 138 useful for determining the audio scene 142 associated with the device 100 at a particular time.

In a particular implementation, the device 100 is included in a system-in-package or system-on-chip device 602. In a particular implementation, the memory 608, the processor 604, the processor(s) 606, the display controller 610, the CODEC 624, the modem 612, and the transceiver 614 are included in the system-in-package or system-on-chip device 602. In a particular implementation, the input device 136 and a power supply 630 are coupled to the system-on-chip device 602. Moreover, in a particular implementation, as illustrated in FIG. 6, the display 620, the input device 136, the speaker(s) 622, the sensors 134, the clock 132, the antenna 616, and the power supply 630 are external to the system-on-chip device 602. In a particular implementation, each of the display 620, the input device 136, the speaker(s) 622, the sensors 134, the clock 132, the antenna 616, and the power supply 630 may be coupled to a component of the system-on-chip device 602, such as an interface or a controller.

The device 100 may include, correspond to, or be included within a voice activated device, an audio device, a wireless speaker and voice activated device, a portable electronic device, a car, a vehicle, a computing device, a communication device, an internet-of-things (IoT) device, a virtual reality (VR) device, an augmented reality (AR) device, a mixed reality (MR) device, a smart speaker, a mobile computing device, a mobile communication device, a smart phone, a cellular phone, a laptop computer, a computer, a tablet, a personal digital assistant, a display device, a television, a gaming console, an appliance, a music player, a radio, a digital video player, a digital video disc (DVD) player, a tuner, a camera, a navigation device, or any combination thereof. In a particular aspect, the processor 604, the processor(s) 606, or a combination thereof, are included in an integrated circuit.

FIG. 7 is an illustrative example of a vehicle 700 that incorporates aspects of the device 100 of FIG. 1. According to one implementation, the vehicle 700 is a self-driving car. According to other implementations, the vehicle 700 is a car, a truck, a motorcycle, an aircraft, a water vehicle, etc. In FIG. 7, the vehicle 700 includes the display 620, one or more of the sensors 134, the device 100, or a combination thereof. The sensors 134 and the device 100 are shown using a dotted line to indicate that these components might not be visible to passengers of the vehicle 700. The device 100 can be integrated into the vehicle 700 or coupled to the vehicle 700.

In a particular aspect, the device 100 is coupled to the display 620 and provides an output to the display 620 responsive to one of the SEC models 114 detecting or recognizing various events (e.g., sound events) described herein. For example, the device 100 provides the output 124 of FIG. 1 to the display 620 indicating a sound class of a sound 102 (such as a car horn) that was recognized by one of the SEC models 114 in audio data samples 110 received from the microphone(s) 104. In some implementations, the device 100 can perform an action responsive to recognizing a sound event, such as alerting an operator of the vehicle or activating one of the sensors 134. In a particular example, the device 100 provides an output that indicates whether an action is being performed responsive to the recognized sound event. In a particular aspect, a user can select an option displayed on the display 620 to enable or disable a performance of actions responsive to recognized sound events.

In a particular implementations, the sensors 134 include the microphone(s) 104 of FIG. 1, vehicle occupancy sensors, eye tracking sensor, position sensor(s) 652, or external environment sensors (e.g., lidar sensors or cameras). In a particular aspect, sensor input of the sensors 134 indicates a location of the user. For example, the sensors 134 are associated with various locations within the vehicle 700.

The device 100 in FIG. 7 includes the SEC models 114, the SEC engine 120, the drift detector 128, the scene detector 140, and the model updater 152. In other implementations, the device 100, when installed in or used in the vehicle 700, omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the vehicle 700 for used by the SEC engine 120. In some implementations, the device 100, when installed in or used in the vehicle 700, further includes the model checker 320 of FIG. 3.

Thus, the techniques described with respect to FIGS. 1-5 enable a user of the vehicle 700 to generate an updated SEC model to account for drift that is specific (perhaps unique) to the acoustic environment in which the device 100 operates. In some implementations, the device 100 can generate the updated SEC model without user intervention. Further, the techniques described with respect to FIGS. 1-5 enable a user of the vehicle 700 to generate an updated SEC model to detect one or more new sound classes. In addition, the SEC model can be updated without excessive use of computing resources onboard the vehicle 700. For example, the vehicle 700 does not have to store all of the training data used train an SEC model from scratch in a local memory.

FIG. 8 depicts an example of the device 100 coupled to or integrated within a headset 802, such as a virtual reality headset, an augmented reality headset, a mixed reality headset, an extended reality headset, a head-mounted display, or a combination thereof. A visual interface device, such as the display 620, is positioned in front of the user's eyes to enable display of augmented reality, mixed reality, or virtual reality images or scenes to the user while the headset 802 is worn. In a particular example, the display 620 is configured to display output of the device 100, such as an indication of a recognized sound event (e.g., the output 124 of FIG. 1). The headset 802 includes the sensors 134, such as the microphone(s) 104 of FIG. 1, the camera(s) 650 of FIG. 6, the position sensor(s) 652 of FIG. 6, the other sensors 654 of FIG. 6, or a combination thereof. Although illustrated in a single location, in other implementations the sensors 134 can be positioned at other locations of the headset 802, such as an array of one or more microphones and one or more cameras distributed around the headset 802 to detect multi-modal inputs.

The sensors 134 enable detection of audio data, which the device 100 uses to detect sound events or to update the SEC models 114. For example, the SEC engine 120 uses one or more of the SEC models 114 to generate the sound event classification data which may be provided to the display 620 to indicate that a recognized sound event, such as a car horn, is detected in audio data samples received from the sensors 134. In some implementations, the device 100 can perform an action responsive to recognizing a sound event, such as activating a camera or another one of the sensors 134 or providing haptic feedback to the user.

In the example illustrated in FIG. 8, the device 100 includes the SEC models 114, the SEC engine 120, the drift detector 128, the scene detector 140, and the model updater 152. In other implementations, the device 100, when installed in or used in the headset 802, omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the headset 802 for use by the SEC engine 120. In some implementations, the device 100, when installed in or used in the headset 802, further includes the model checker 320 of FIG. 3.

FIG. 9 depicts an example of the device 100 integrated into a wearable electronic device 902, illustrated as a "smart watch," that includes the display 620 and the sensors 134. The sensors 134 enable detection, for example, of user input and audio scenes based on modalities such as location, video, speech, and gesture. The sensors 134 also enable detection of sounds in an acoustic environment around the wearable electronic device 902, which the device 100 uses to detect sound events or to update the SEC models 114. For example, the device 100 provides the output 124 of FIG. 1 to the display 620 indicating that a recognized sound event is detected in audio data samples received from the sensors 134. In some implementations, the device 100 can perform an action responsive to recognizing a sound event, such as activating a camera or another one of the sensors 134 or providing haptic feedback to the user.

In the example illustrated in FIG. 9, the device 100 includes the SEC models 114, the SEC engine 120, the drift detector 128, the scene detector 140, and the model updater 152. In other implementations, the device 100, when installed in or used in the wearable electronic device 902, omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the wearable electronic device 902 for use by the SEC engine 120. In some implementations, the device 100, when installed in or used in the wearable electronic device 902, further includes the model checker 320 of FIG. 3.

FIG. 10 is an illustrative example of a voice-controlled speaker system 1000. The voice-controlled speaker system 1000 can have wireless network connectivity and is configured to execute an assistant operation. In FIG. 10, the device 100 is included in the voice-controlled speaker system 1000. The voice-controlled speaker system 1000 also includes a speaker 1002 and sensors 134. The sensors 134 include microphone(s) 104 of FIG. 1 to receive voice input or other audio input.

During operation, in response to receiving a verbal command or a recognized sound event, the voice-controlled speaker system 1000 can execute assistant operations. The assistant operations can include adjusting a temperature, playing music, turning on lights, etc. The sensors 134 enable detection of audio data samples, which the device 100 uses to detect sound events or to update one or more of the SEC models 114. Additionally, the voice-controlled speaker system 1000 can execute some operations based on sound events recognized by the device 100. For example, if the device 100 recognizes the sound of a door closing, the voice-controlled speaker system 1000 can turn on one or more lights.

In the example illustrated in FIG. 10, the device 100 includes the SEC models 114, the SEC engine 120, the drift detector 128, the scene detector 140, and the model updater 152. In other implementations, the device 100, when installed in or used in the voice-controlled speaker system 1000 omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the voice-controlled speaker system 1000 for use by the SEC engine 120. In some implementations, the device 100, when installed in or used in the voice-controlled speaker system 1000, further includes the model checker 320 of FIG. 3.

FIG. 11 illustrates a camera 1100 that incorporates aspects of the device 100 of FIG. 1. In FIG. 11, the device 100 is incorporated in or coupled to the camera 1100. The camera 1100 includes an image sensor 1102 and one or more other sensors (e.g., the sensors 134), such as the microphone(s) 104 of FIG. 1. Additionally, the camera 1100 includes the device 100, which is configured to identify sound events based on audio data samples and to update one or more of the SEC models 114. In a particular aspect, the camera 1100 is configured to perform one or more actions in response to a recognized sound event. For example, the camera 1100 may cause the image sensor 1102 to capture an image in response to the device 100 detecting a particular sound event in the audio data samples from the sensors 134.

In the example illustrated in FIG. 11, the device 100 includes the SEC models 114, the SEC engine 120, the drift detector 128, the scene detector 140, and the model updater 152. In other implementations, the device 100, when installed in or used in the camera 1100, omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the camera 1100 for use by the SEC engine 120. In some implementations, the device 100, when installed in or used in the camera 1100, further includes the model checker 320 of FIG. 3.

FIG. 12 illustrates a mobile device 1200 that incorporates aspects of the device 100 of FIG. 1. In FIG. 12, the mobile device 1200 includes or is coupled to the device 100 of FIG. 1. The mobile device 1200 includes a phone or tablet, as illustrative, non-limiting examples. The mobile device 1200 includes a display 620 and the sensors 134, such as the microphone(s) 104 of FIG. 1, the camera(s) 650 of FIG. 6, the position sensor(s) 652 of FIG. 6, or the other sensor(s) 654 of FIG. 6. During operation, the mobile device 1200 may perform particular actions in response to the device 100 recognizing a particular sound event. For example, the actions can include sending commands to other devices, such as a thermostat, a home automation system, another mobile device, etc.

In the example illustrated in FIG. 12, the device 100 includes the SEC models 114, the SEC engine 120, the drift detector 128, the scene detector 140, and the model updater 152. In other implementations, the device 100, when installed in or used in the mobile device 1200, omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the mobile device 1200 for use by the SEC engine 120. In some implementations, the device 100, when installed in or used in the mobile device 1200, further includes the model checker 320 of FIG. 3.

FIG. 13 illustrates an aerial device 1300 that incorporates aspects of the device 100 of FIG. 1. In FIG. 13, the aerial device 1300 includes or is coupled to the device 100 of FIG. 1. The aerial device 1300 is a manned, unmanned, or remotely piloted aerial device (e.g., a package delivery drone). The aerial device 1300 includes a control system 1302 and the sensors 134, such as the microphone(s) 104 of FIG. 1, the camera(s) 650 of FIG. 6, the position sensor(s) 652 of FIG. 6, or the other sensor(s) 654 of FIG. 6. The control system 1302 controls various operations of the aerial device 1300, such as cargo release, sensor activation, take-off, navigation, landing, or combinations thereof. For example, the control system 1302 may control flight of the aerial device 1300 between specified points and deployment of cargo at a particular location. In a particular aspect, the control system 1302 performs one or more action responsive to detection of a particular sound event by the device 100. To illustrate, the control system 1302 may initiate a safe landing protocol in response to the device 100 detecting an aircraft engine.

In the example illustrated in FIG. 13, the device 100 includes the SEC models 114, the SEC engine 120, the drift detector 128, the scene detector 140, and the model updater

152. In other implementations, the device 100, when installed in or used in the aerial device 1300, omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the aerial device 1300 for use by the SEC engine 120. In some implementations, the device 100, when installed in or used in the aerial device 1300, further includes the model checker 320 of FIG. 3.

FIG. 14 illustrates a headset 1400 that incorporates aspects of the device 100 of FIG. 1. In FIG. 14, the headset 1400 includes or is coupled to the device 100 of FIG. 1. The headset 1400 includes the microphone(s) 104 of FIG. 1 positioned to primarily capture speech of a user. The headset 1400 may also include one or more additional microphone positioned to primarily capture environmental sounds (e.g., for noise canceling operations) and one or more of the sensors 134, such as the camera(s) 650, the position sensor(s) 652, or the other sensor(s) 654 of FIG. 6. In a particular aspect, the headset 1400 performs one or more actions responsive to detection of a particular sound event by the device 100. To illustrate, the headset 1400 may activate a noise cancellation feature in response to the device 100 detecting a gunshot. The headset 1400 may also update one or more of the SEC models 114.

In the example illustrated in FIG. 14, the device 100 includes the SEC models 114, the SEC engine 120, the drift detector 128, the scene detector 140, and the model updater 152. In other implementations, the device 100, when installed in or used in the headset 1400, omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the headset 1400 for use by the SEC engine 120. In some implementations, the device 100, when installed in or used in the headset 1400, further includes the model checker 320 of FIG. 3.

FIG. 15 illustrates an appliance 1500 that incorporates aspects of the device 100 of FIG. 1. In FIG. 15, the appliance 1500 is a lamp; however, in other implementations, the appliance 1500 includes another Internet-of-Things appliance, such as a refrigerator, a coffee maker, an oven, another household appliance, etc. The appliance 1500 includes or is coupled to the device 100 of FIG. 1. The appliance 1500 includes the sensors 134, such as the microphone(s) 104 of FIG. 1, the camera(s) 650 of FIG. 6, the position sensor(s) 652 of FIG. 6, or the other sensor(s) 654 of FIG. 6. In a particular aspect, the appliance 1500 performs one or more actions responsive to detection of a particular sound event by the device 100. To illustrate, the appliance 1500 may activate a light in response to the device 100 detecting a door closing. The appliance 1500 may also update one or more of the SEC models 114.

In the example illustrated in FIG. 15, the device 100 includes the SEC models 114, the SEC engine 120, the drift detector 128, the scene detector 140, and the model updater 152. In other implementations, the device 100, when installed in or used in the appliance 1500, omits the model updater 152. To illustrate, the model update data 148 of FIG. 6 may be sent to the remote computing device 618, and the remote computing device 618 may update one of the SEC models 114 based on the model update data 148. In such implementations, the updated SEC model 114 can be downloaded to the appliance 1500 for use by the SEC engine 120. In some implementations, the device 100, when installed in or used in the appliance 1500, further includes the model checker 320 of FIG. 3.

FIG. 16 is a flow chart illustrating an example of a method 1600 of operation of the device 100 of FIG. 1. The method 1600 can be initiated, controlled, or performed by the device 100. For example, the processor(s) 604 or 606 of FIG. 6 can execute instructions 660 from the memory 608 to cause the drift detector 128 to generate the model update data 148.

In block 1602, the method 1600 includes providing audio data samples as input to a sound event classification model. For example, the SEC engine 120 of FIG. 1 (or the processor(s) 606, 606 of FIG. 6 executing instructions 660 corresponding to the SEC engine 120) may provide the audio data samples 110 as input to the SEC model 112. In some implementations, the method 1600 also includes capturing audio data corresponding to the audio data samples. For example, the microphone(s) 104 of FIG. 1 may generate the audio signals 106 based on the sound 102 detected by the microphone(s) 104. Further, in some implementations, the method 1600 includes selecting the sound event classification model from among a plurality of sound event classification models stored at a memory. For example, the SEC engine 120 of FIG. 1 (or the processor(s) 606, 606 of FIG. 6 executing instructions 660 corresponding to the SEC engine 120) may select the SEC model 112 from among the available SEC models 114 based on sensor data associated with the audio data samples, based on input identifying an audio scene or the SEC model 112, based on when the audio data samples are received, based on settings data, or based on a combination thereof.

In block 1604, the method 1600 includes determining, based on an output of the sound event classification model responsive to the audio data samples, whether a sound class of the audio data samples was recognized by the sound event classification model. For example, the SEC engine 120 of FIG. 1 (or the processor(s) 606, 606 of FIG. 6 executing instructions 660 corresponding to the SEC engine 120) may determine whether a sound class 122 of the audio data samples 110 was recognized by the SEC model 112. To illustrate, the SEC model 112 may generate a confidence metric associated with each sound class that the SEC model 112 is trained to recognize, and a determination of whether the sound class was recognized by the SEC model may be based on the values of the confidence metric(s). In a particular aspect, based on a determination that the sound class 122 was recognized by the SEC model 112, the SEC engine 120 generates the output 124 indicating the sound class 122 associated with the audio data samples 110.

In block 1606, the method 1600 includes based on a determination that the sound class was not recognized, determining whether the sound event classification model corresponds to an audio scene associated with the audio data samples. For example, the drift detector 128 of FIG. 1 (or the processor(s) 606, 606 of FIG. 6 executing instructions 660 corresponding to the drift detector 128) may determining whether the SEC model 112 corresponds to the audio scene 142 associated with the audio data samples 110. To illustrate, the scene detector 140 may determine the audio scene 142 based on input received via that input device 136, based on sensor data from the sensor(s) 134, based on a timestamp associated with the audio data samples 110 as indicated by the clock 132, based on the settings data 130, or based on a combination thereof. In implementations in which the SEC model 112 is selected from among the available SEC models, the determination of the audio scene 142 may be based on different information than information used to select the SEC model 112.

In block 1608, the method 1600 includes, based on a determination that the sound event classification model corresponds to the audio scene associated with the audio data samples, storing model update data based on the audio data samples. For example, the drift detector 128 of FIG. 1 (or the processor(s) 606, 606 of FIG. 6 executing instructions 660 corresponding to the drift detector 128) may store the model update data 148 based on the audio data samples 110. In a particular aspect, if the drift detector 128 determines that the SEC model 112 corresponds to the audio scene 142 associated with the audio data samples 110, the drift detector 128 stores the drift data 144 as the model update data 148, and if the drift detector 128 determines that the SEC model 112 does not corresponds to the audio scene 142 associated with the audio data samples 110, the drift detector 128 stores the unknown data 146 as the model update data 148.

The method 1600 may also include updating the SEC model based on the model update data. For example, the model updater 152 of FIG. 1 (or the processor(s) 606, 606 of FIG. 6 executing instructions 660 corresponding to the model updater 152) may update the SEC model 112 based on the model update data 148 as described with reference to FIG. 2, as described with reference to FIG. 3, or both.

In a particular aspect, the method 1600 includes after storing the model update data, determining whether a threshold quantity of model update data has been accumulated. For example, the model updater 152 may determine when the model update data 148 of FIG. 1 includes sufficient data (e.g., a threshold quantity of model update data 148 associated with a particular SEC model and a particular sound class) to initiate update training of the SEC model 112. The method 1600 may also include, based on a determination that the threshold quantity of model update data has been accumulated, initiating an automatic update of the sound event classification model using accumulated model update data. For example, the model updater 152 may initiate the model update without input from the user. In a particular implementation, the automatic update fine-tunes the SEC model 112 to generate the updated SEC model 154. For example, before the automatic update, the SEC model 112 was trained to recognize multiple variants of a particular sound class, and the automatic update modifies the SEC model 112 to enable the SEC model 112 to recognize an additional variant of the particular sound class as corresponding to the particular sound class.

Due to the manner in which training occurs, an SEC model is generally a closed-set. That is, the number and type of sound classes that the SEC model can recognize is fixed and limited during the training. After training, an SEC model typically has a static relationship between the input and output. This static relationship between input and output means that the mapping learned during training is valid in the future (e.g., when evaluating new data), and that the relationships between input and output data do not change. However, it is difficult to collect an exhaustive set of training samples for each sound class, and it is difficult to properly annotate all of the available training data to train a comprehensive and sophisticated SEC model.

In contrast, during use SEC models face an open-set problem. For example, during use, the SEC model may be provided data samples associated with both known and unknown sound events. Additionally, the distribution of sounds or sound features in each sound class that the SEC model is trained to recognize can change over time or may not be comprehensively represented in the available training data. For example, for traffic sounds, differences in sounds based on locations, times, busy or non-busy intersection, etc. may not be explicitly captured in the training data for a traffic sound class. For these and other reasons, there can be discrepancies between the training data used to train an SEC model and the dataset that the SEC model is provided during use. Such discrepancies (e.g., dataset shift or drift) depends on various factors, such as location, time, device that is capturing the sound signal, etc. Dataset shift can lead to poor prediction results from the SEC model. The disclosed systems and methods overcome these and other problems by adapting an SED model to detect such shift data with little or no supervision. Additionally, in some aspects, an SEC model can be updated to recognize new sound classes without forgetting the previous trained sound classes.

In a particular aspect, no training of the SEC models is performed while the system is operating in an inference mode. Rather, during operation in the inference mode, existing knowledge, in the form of one or more previously trained SEC models, is used to analyze detected sounds. More than one SEC model can be used to analyze the sound. For example, an ensemble of SEC models can be used during operation in the inference mode. A particular SEC can be selected from a set of available SEC models based on detection of a trigger condition. To illustrate, a particular SEC model will be used, as the active SEC model, which may also be referred to as the "source SEC model", whenever a certain trigger (or triggers) is activated. The trigger(s) may be based on locations, sounds, camera information, other sensor data, user input, etc. For example, a particular SEC model may be trained to recognized sound events related to crowded areas, such as theme parks, outdoor shopping malls, public squares, etc. In this example, the particular SEC model may be used as the active SEC model when global positioning data indicates that a device capturing sound is at any of these locations. In this example, the trigger is based on the location of the device capturing sound, and the active SEC model is selected and loaded (e.g., in addition to or in place of a previous active SEC model) when the device is detected to be in the location.

In conjunction with the described implementations, an apparatus includes means for providing audio data samples to a sound event classification model. For example, the means providing audio data samples to a sound event classification model include the device 100, the instructions 660, the processor 604, the processor(s) 606, the SEC engine 120, the feature extractor 108, the microphone(s) 104, the CODEC 624, one or more other circuits or components configured to provide audio data samples to a sound event classification model, or any combination thereof.

The apparatus also includes means for determining, based on an output of the sound classification model, whether a sound class of the audio data samples was recognized by the sound event classification model. For example, the means for determining whether the sound class of the audio data samples was recognized by the sound event classification model includes the device 100, the instructions 660, the processor 604, the processor(s) 606, the SEC engine 120, one or more other circuits or components configured to determine whether the sound class of the audio data samples was recognized by the sound event classification model, or any combination thereof.

The apparatus also includes means for determining, responsive to a determination that the sound class was not recognized, whether the sound event classification model corresponds to an audio scene associated with the audio data samples. For example, the means for determining whether the sound event classification model corresponds to the audio scene associated with the audio data samples includes the device 100, the instructions 660, the processor 604, the processor(s) 606, the drift detector 128, the scene detector 140, one or more other circuits or components configured to determine whether the sound event classification model corresponds to the audio scene associated with the audio data samples, or any combination thereof.

The apparatus also includes means for storing, responsive to a determination that the sound event classification model corresponds to the audio scene associated with the audio data samples, model update data based on the audio data samples. For example, the means for storing the model update data includes the remote computing device 618, the device 100, the instructions 660, the processor 604, the processor(s) 606, the drift detector 128, the memory 608, one or more other circuits or components configured to store model update data, or any combination thereof.

In some implementations, the apparatus includes means for selecting the sound event classification model from among a plurality of sound event classification models based on a selection criterion. For example, the means for selecting the sound event classification model includes the device 100, the instructions 660, the processor 604, the processor(s) 606, the SEC engine 120, one or more other circuits or components configured to select the sound event classification model, or any combination thereof.

In some implementations, the apparatus includes means for updating the sound event classification model based on the model update data. For example, the means for updating the sound event classification model based on the model update data includes the remote computing device 618, the device 100, the instructions 660, the processor 604, the processor(s) 606, the model updater 152, the model checker 320, one or more other circuits or components configured to update the sound event classification model, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Particular aspects of the disclosure are described below in a first set of interrelated clauses:

According to Clause 1, a device includes one or more processors configured to provide audio data samples to a sound event classification model. The one or more processors are further configured to determine, based on an output of the sound event classification model responsive to the audio data samples, whether a sound class of the audio data samples was recognized by the sound event classification model. The one or more processors are also configured to determine, based on a determination that the sound class was not recognized, whether the sound event classification model corresponds to an audio scene associated with the audio data samples. The one or more processors are further configured to store, based on a determination that the sound event classification model corresponds to the audio scene associated with the audio data samples, model update data based on the audio data samples.

Clause 2 includes the device of Clause 1 and further includes a microphone coupled to the one or more processors and configured to capture audio data corresponding to the audio data samples.

Clause 3 includes the device of Clause 1 or Clause 2 and further includes a memory coupled to the one or more processors and configured to store a plurality of sound event classification models, wherein the one or more processors are configured select the sound event classification model from among the plurality of sound event classification models.

Clause 4 includes the device of Clause 3 and further includes one or more sensors configured to generate sensor data associated with the audio data samples, wherein the one or more processors are configured to select the sound event classification model based on the sensor data.

Clause 5 includes the device of Clause 4 wherein the one or more sensors include a camera and a position sensor.

Clause 6 includes the device of any of Clauses 3 to 5 and further includes one or more input devices configured to receive input identifying the audio scene, wherein the one or more processors are configured to select the sound event classification model based on the audio scene.

Clause 7 includes the device of any of Clauses 3 to 6 wherein the one or more processors are configured to select the sound event classification model based on when the audio data samples are received.

Clause 8 includes the device of any of Clauses 3 to 8 wherein the memory further stores settings data indicating one or more device settings, and wherein the one or more processors are configured to select the sound event classification model based on the settings data.

Clause 9 includes the device of any of Clauses 1 to 8 wherein the one or more processors are further configured to generate, based on a determination that the sound class was recognized, output indicating the sound class associated with the audio data samples.

Clause 10 includes the device of any of Clauses 1 to 9 wherein the one or more processors are further configured to, based on a determination that the sound event classification model does not correspond to the audio scene associated with the audio data samples, store audio data corresponding to the audio data samples as training data for a new sound event classification model.

Clause 11 includes the device of any of Clauses 1 to 10 wherein the sound event classification model is further configured to generate a confidence metric associated with the output, and wherein the one or more processors are configured to determine whether the sound class was recognized by the sound event classification model based on the confidence metric.

Clause 12 includes the device of any of Clauses 1 to 11 wherein the one or more processors are further configured update the sound event classification model based on the model update data.

Clause 13 includes the device of any of Clauses 1 to 12 and further includes one or more input devices configured to receive input identifying the audio scene, wherein the one or more processors are configured to determine whether the sound event classification model corresponds to the audio scene based on the input.

Clause 14 includes the device of any of Clauses 1 to 13 and further includes one or more sensors configured to generate sensor data associated with the audio data samples, wherein the one or more processors are configured to determine whether the sound event classification model corresponds to the audio scene based on the sensor data.

Clause 15 includes the device of Clause 14 wherein the one or more sensors include a camera and a position sensor.

Clause 16 includes the device of Clause 14 or Clause 15 wherein the one or more processors are further configured to determine whether the sound event classification model corresponds to the audio scene based on a timestamp associated with the audio data samples.

Clause 17 includes the device of any of Clauses 1 to 16 wherein the one or more processors are integrated within a mobile computing device.

Clause 18 includes the device of any of Clauses 1 to 16 wherein the one or more processors are integrated within a vehicle.

Clause 19 includes the device of any of Clauses 1 to 16 wherein the one or more processors are integrated within a wearable device.

Clause 20 includes the device of any of Clauses 1 to 16 wherein the one or more processors are integrated within an augmented reality headset, a mixed reality headset, or a virtual reality headset.

Clause 21 includes the device of any of Clauses 1 to 20 wherein the one or more processors are included in an integrated circuit.

Clause 22 includes the device of any of Clauses 1 to 21 wherein the sound event classification model is trained to recognize a particular sound class and the model update data includes drift data representing a variation in characteristics of a sound within the particular sound class that the sound event classification model is not trained to recognize as corresponding to the particular sound class.

Particular aspects of the disclosure are described below in a second set of interrelated clauses:

According to Clause 23, a method includes providing, by one or more processors, audio data samples as input to a sound event classification model. The method also includes determining, by the one or more processors based on an output of the sound event classification model responsive to the audio data samples, whether a sound class of the audio data samples was recognized by the sound event classification model. The method further includes, based on a determination that the sound class was not recognized, determining, by the one or more processors, whether the sound event classification model corresponds to an audio scene associated with the audio data samples. The method also includes, based on a determination that the sound event classification model corresponds to the audio scene associated with the audio data samples, storing, by the one or more processors, model update data based on the audio data samples.

Clause 24 includes the method of Clause 23 and further includes selecting the sound event classification model from among a plurality of sound event classification models stored at a memory coupled to the one or more processors.

Clause 25 includes the method of Clause 24 wherein the sound event classification model is selected based on user input, settings data, location data, image data, video data, a timestamp associated with the audio data samples, or a combination thereof.

Clause 26 includes the method of any of Clauses 23 to 25 wherein a determination of whether the sound event classification model corresponds to the audio scene is based on a confidence metric generated by the sound event classification model, user input, settings data, location data, image data, video data, a timestamp associated with the audio data samples, or a combination thereof.

Clause 27 includes the method of any of Clauses 23 to 26 and further includes capturing audio data corresponding to the audio data samples.

Clause 28 includes the method of any of Clauses 23 to 27 and further includes selecting the sound event classification model from among a plurality of available sound event classification models.

Clause 29 includes the method of any of Clauses 23 to 27 and further includes receiving sensor data associated with the audio data samples and selecting the sound event classification model from among a plurality of available sound event classification models based on the sensor data.

Clause 30 includes the method of any of Clauses 23 to 27 and further includes receiving input identifying the audio scene and selecting the sound event classification model from among a plurality of available sound event classification models based on the audio scene.

Clause 31 includes the method of any of Clauses 23 to 27 and further includes selecting the sound event classification model from among a plurality of available sound event classification models based on when the audio data samples are received.

Clause 32 includes the method of any of Clauses 23 to 27 and further includes selecting the sound event classification model from among a plurality of available sound event classification models based on the settings data.

Clause 33 includes the method of any of Clauses 23 to 32 and further includes generating, based on a determination that the sound class was recognized, output indicating the sound class associated with the audio data samples.

Clause 34 includes the method of any of Clauses 23 to 33 and further includes, based on a determination that the sound event classification model does not correspond to the audio scene associated with the audio data samples, storing audio data corresponding to the audio data samples as training data for a new sound event classification model.

Clause 35 includes the method of any of Clauses 23 to 34 wherein the output of the sound event classification model includes a confidence metric, and the method further includes determining whether the sound class was recognized by the sound event classification model based on the confidence metric.

Clause 36 includes the method of any of Clauses 23 to 35 and further includes updating the sound event classification model based on the model update data.

Clause 37 includes the method of any of Clauses 23 to 36 and further includes receiving input identifying the audio scene, wherein a determination of whether the sound event classification model corresponds to the audio scene is based on the input.

Clause 38 includes the method of any of Clauses 23 to 37 and further includes receiving sensor data associated with the audio data samples, wherein a determination of whether the sound event classification model corresponds to the audio scene is based on the sensor data.

Clause 39 includes the method of any of Clauses 23 to 38 wherein a determination of whether the sound event classification model corresponds to the audio scene is based on a timestamp associated with the audio data samples.

Clause 40 includes the method of any of Clauses 23 to 39 and further includes, after storing the model update data, determining whether a threshold quantity of model update data has been accumulated, and based on a determination that the threshold quantity of model update data has been accumulated, initiating an automatic update of the sound event classification model using accumulated model update data.

Clause 41 includes the method of any of Clauses 23 to 40 wherein, before the automatic update, the sound event classification model was trained to recognize multiple variants of a particular sound class, and wherein the automatic update modifies the sound event classification model to enable the sound event classification model to recognize an additional variant of the particular sound class as corresponding to the particular sound class.

Particular aspects of the disclosure are described below in a third set of interrelated clauses:

According to Clause 42 a device includes means for providing audio data samples to a sound event classification model. The device also includes means for determining, based on an output of the sound event classification model, whether a sound class of the audio data samples was recognized by the sound event classification model. The device further includes means for determining, responsive to a determination that the sound class was not recognized, whether the sound event classification model corresponds to an audio scene associated with the audio data samples. The device also includes means for storing, responsive to a determination that the sound event classification model corresponds to the audio scene associated with the audio data samples, model update data based on the audio data samples.

Clause 43 includes the device of Clause 42 and further includes means for selecting the sound event classification model from among a plurality of sound event classification models based on a selection criterion.

Clause 44 includes the device of Clause 42 or Clause 43 and further includes means for updating the sound event classification model based on the model update data.

Clause 45 includes the device of any of Clauses 42 to 44 and further includes means for capturing audio data corresponding to the audio data samples.

Clause 46 includes the device of any of Clauses 42 to 45 and further includes means for storing a plurality of sound event classification models and means for selecting the sound event classification model from among the plurality of sound event classification models.

Clause 47 includes the device of Clause 46 and further includes means for receiving input identifying the audio scene, wherein the sound event classification model is selected based on the input identifying the audio scene.

Clause 48 includes the device of Clause 46 and further includes means for determining when the audio data samples were received, wherein the sound event classification model is selected based on when the audio data samples were received.

Clause 49 includes the device of Clause 46 and further includes means for storing settings data indicating one or more device settings, wherein the sound event classification model is selected based on the settings data.

Clause 50 includes the device of any of Clauses 42 to 49 and further includes means for generating output indicating the sound class associated with the audio data samples based on a determination that the sound class was recognized.

Clause 51 includes the device of any of Clauses 42 to 50 and further includes means for storing audio data corresponding to the audio data samples as training data for a new sound event classification model based on a determination that the sound event classification model does not correspond to the audio scene associated with the audio data samples.

Clause 52 includes the device of any of Clauses 42 to 51 wherein the sound event classification model is further configured to generate a confidence metric associated with the output, and wherein a determination of whether the sound class was recognized by the sound event classification model is based on the confidence metric.

Clause 53 includes the device of any of Clauses 42 to 52 and further including means for updating the sound event classification model based on the model update data.

Clause 54 includes the device of any of Clauses 42 to 53 and further including means for receiving input identifying the audio scene, wherein a determination of whether the sound event classification model corresponds to the audio scene is based on the input.

Clause 55 includes the device of any of Clauses 42 to 54 and further including means for generating sensor data associated with the audio data samples, wherein a determination of whether the sound event classification model corresponds to the audio scene is based on the sensor data.

Clause 56 includes the device of any of Clauses 42 to 55 wherein a determination of whether the sound event classification model corresponds to the audio scene is based on a timestamp associated with the audio data samples.

Clause 57 includes the device of any of Clauses 42 to 56 wherein the means for providing audio data samples to a sound event classification model, the means for receiving the output of the sound event classification model, the means for determining whether the sound class of the audio data samples was recognized by the sound event classification model, the means for determining whether the sound event classification model corresponds to the audio scene associated with the audio data samples, and the means for storing the model update data based on the audio data samples are integrated within a mobile computing device.

Clause 58 includes the device of any of Clauses 42 to 56 wherein the means for providing audio data samples to a sound event classification model, the means for receiving the output of the sound event classification model, the means for determining whether the sound class of the audio data samples was recognized by the sound event classification model, the means for determining whether the sound event classification model corresponds to the audio scene associated with the audio data samples, and the means for storing the model update data based on the audio data samples are integrated within a vehicle.

Clause 59 includes the device of any of Clauses 42 to 56 wherein the means for providing audio data samples to a sound event classification model, the means for receiving the output of the sound event classification model, the means for determining whether the sound class of the audio data samples was recognized by the sound event classification model, the means for determining whether the sound event classification model corresponds to the audio scene associated with the audio data samples, and the means for storing the model update data based on the audio data samples are integrated within a wearable device.

Clause 60 includes the device of any of Clauses 42 to 56 wherein the means for providing audio data samples to a sound event classification model, the means for receiving the output of the sound event classification model, the means for determining whether the sound class of the audio data samples was recognized by the sound event classification model, the means for determining whether the sound event classification model corresponds to the audio scene associated with the audio data samples, and the means for storing the model update data based on the audio data samples are integrated within an augmented reality headset, a mixed reality headset, or a virtual reality headset.

Clause 61 includes the device of any of Clauses 42 to 60 wherein the means for providing audio data samples to a sound event classification model, the means for receiving the output of the sound event classification model, the means for determining whether the sound class of the audio data samples was recognized by the sound event classification model, the means for determining whether the sound event classification model corresponds to the audio scene associated with the audio data samples, and the means for storing the model update data based on the audio data samples are included in an integrated circuit.

Particular aspects of the disclosure are described below in a fourth set of interrelated clauses:

According to Clause 62, a non-transitory computer-readable medium storing instructions that are executable by a processor to cause the processor to provide audio data samples as input to a sound event classification model. The instructions are also executable by a processor to determine, based on an output of the sound event classification model responsive to the audio data samples, whether a sound class of the audio data samples was recognized by the sound event classification model. The instructions are further executable by a processor to, based on a determination that the sound class was not recognized, determine whether the sound event classification model corresponds to an audio scene associated with the audio data samples. The instructions are further executable by a processor to, based on a determination that the sound event classification model corresponds to the audio scene associated with the audio data samples, store model update data based on the audio data samples.

Clause 63 includes the non-transitory computer-readable medium of Clause 62 wherein the instructions further cause the processor to update the sound event classification model based on the model update data.

Clause 64 includes the non-transitory computer-readable medium of Clause 62 or Clause 63 wherein the instructions further cause the processor to select the sound event classification model from among a plurality of sound event classification models stored in a memory.

Clause 65 includes the non-transitory computer-readable medium of Clause 64 wherein the instructions cause the processor to select the sound event classification model based on sensor data.

Clause 66 includes the non-transitory computer-readable medium of Clause 64 wherein the instructions cause the processor to select the sound event classification model based on input identifying an audio scene associated with the audio data samples.

Clause 67 includes the non-transitory computer-readable medium of Clause 64 wherein the instructions cause the processor to select the sound event classification model based on when the audio data samples are received.

Clause 68 includes the non-transitory computer-readable medium of Clause 64 wherein the instructions cause the processor to select the sound event classification model based on settings data.

Clause 69 includes the non-transitory computer-readable medium of any of Clauses 62 to 68 wherein the instructions cause the processor to generate, based on a determination that the sound class was recognized, output indicating the sound class associated with the audio data samples.

Clause 70 includes the non-transitory computer-readable medium of any of Clauses 62 to 69 wherein the instructions cause the processor to, based on a determination that the sound event classification model does not correspond to the audio scene associated with the audio data samples, store audio data corresponding to the audio data samples as training data for a new sound event classification model.

Clause 71 includes the non-transitory computer-readable medium of any of Clauses 62 to 70 wherein the instructions cause the processor to generate a confidence metric associated with the output, and wherein a determination of whether the sound class was recognized by the sound event classification model is based on the confidence metric.

Clause 72 includes the non-transitory computer-readable medium of any of Clauses 62 to 71 wherein the instructions cause the processor to update the sound event classification model based on the model update data.

Clause 73 includes the non-transitory computer-readable medium of any of Clauses 62 to 72 wherein a determination of whether the sound event classification model corresponds to the audio scene is based on user input indicating the audio scene.

Clause 74 includes the non-transitory computer-readable medium of any of Clauses 62 to 73 wherein a determination of whether the sound event classification model corresponds to the audio scene based on sensor data.

Clause 75 includes the non-transitory computer-readable medium of any of Clauses 62 to 74 wherein a determination of whether the sound event classification model corresponds to the audio scene based on a timestamp associated with the audio data samples.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:
1. A device comprising:
one or more processors configured to:
provide audio data samples to a sound event classification model;
determine, based on an output of the sound event classification model responsive to the audio data samples, whether a sound class of the audio data samples was recognized by the sound event classification model;

based on a determination that the sound class was not recognized, determine whether the sound event classification model corresponds to an audio scene associated with the audio data samples; and based on a determination that the sound event classification model corresponds to the audio scene associated with the audio data samples, store model update data based on the audio data samples.

2. The device of claim 1, further comprising a microphone coupled to the one or more processors and configured to capture audio data corresponding to the audio data samples.

3. The device of claim 1, further comprising a memory coupled to the one or more processors and configured to store a plurality of sound event classification models, wherein the one or more processors are configured select the sound event classification model from among the plurality of sound event classification models.

4. The device of claim 3, further comprising one or more sensors configured to generate sensor data associated with the audio data samples, wherein the one or more processors are configured to select the sound event classification model based on the sensor data.

5. The device of claim 4, wherein the one or more sensors include a camera and a position sensor.

6. The device of claim 3, further comprising one or more input devices configured to receive input identifying the audio scene, wherein the one or more processors are configured to select the sound event classification model based on the audio scene.

7. The device of claim 3, wherein the one or more processors are configured to select the sound event classification model based on when the audio data samples are received.

8. The device of claim 3, wherein the memory further stores settings data indicating one or more device settings, and wherein the one or more processors are configured to select the sound event classification model based on the settings data.

9. The device of claim 1, wherein the one or more processors are further configured to generate, based on a determination that the sound class was recognized, output indicating the sound class associated with the audio data samples.

10. The device of claim 1, wherein the one or more processors are further configured to, based on a determination that the sound event classification model does not correspond to the audio scene associated with the audio data samples, store audio data corresponding to the audio data samples as training data for a new sound event classification model.

11. The device of claim 1, wherein the sound event classification model is further configured to generate a confidence metric associated with the output, and wherein the one or more processors are configured to determine whether the sound class was recognized by the sound event classification model based on the confidence metric.

12. The device of claim 1, wherein the one or more processors are further configured update the sound event classification model based on the model update data.

13. The device of claim 1, further comprising one or more input devices configured to receive input identifying the audio scene, wherein the one or more processors are configured to determine whether the sound event classification model corresponds to the audio scene based on the input.

14. The device of claim 1, further comprising one or more sensors configured to generate sensor data associated with the audio data samples, wherein the one or more processors are configured to determine whether the sound event classification model corresponds to the audio scene based on the sensor data.

15. The device of claim 14, wherein the one or more sensors include a camera and a position sensor.

16. The device of claim 14, wherein the one or more processors are further configured to determine whether the sound event classification model corresponds to the audio scene based on a timestamp associated with the audio data samples.

17. The device of claim 1, wherein the sound event classification model is trained to recognize a particular sound class and the model update data includes drift data representing a variation in characteristics of a sound within the particular sound class that the sound event classification model is not trained to recognize as corresponding to the particular sound class.

18. The device of claim 1, wherein the one or more processors are integrated within a mobile computing device, a vehicle, a wearable device, an augmented reality headset, a mixed reality headset, or a virtual reality headset.

19. The device of claim 1, wherein the one or more processors are included in an integrated circuit.

20. A method comprising:

providing, by one or more processors, audio data samples as input to a sound event classification model;

determining, by the one or more processors based on an output of the sound event classification model responsive to the audio data samples, whether a sound class of the audio data samples was recognized by the sound event classification model;

based on a determination that the sound class was not recognized, determining, by the one or more processors, whether the sound event classification model corresponds to an audio scene associated with the audio data samples; and based on a determination that the sound event classification model corresponds to the audio scene associated with the audio data samples, storing, by the one or more processors, model update data based on the audio data samples.

21. The method of claim 20, further comprising selecting the sound event classification model from among a plurality of sound event classification models stored at a memory coupled to the one or more processors.

22. The method of claim 21, wherein the sound event classification model is selected based on user input, settings data, location data, image data, video data, a timestamp associated with the audio data samples, or a combination thereof.

23. The method of claim 20, wherein a determination of whether the sound event classification model corresponds to the audio scene is based on a confidence metric generated by the sound event classification model, user input, settings data, location data, image data, video data, a timestamp associated with the audio data samples, or a combination thereof.

24. The method of claim 20, further comprising, after storing the model update data:

determining whether a threshold quantity of model update data has been accumulated, and based on a determination that the threshold quantity of model update data has been accumulated, initiating an automatic update of the sound event classification model using accumulated model update data.

25. The method of claim 24, wherein before the automatic update, the sound event classification model was trained to recognize multiple variants of a particular sound class, and wherein the automatic update modifies the sound event classification model to enable the sound event classification model to recognize an additional variant of the particular sound class as corresponding to the particular sound class.

26. A device comprising:
means for providing audio data samples to a sound event classification model;
means for determining, based on an output of the sound event classification model, whether a sound class of the audio data samples was recognized by the sound event classification model;
means for determining, responsive to a determination that the sound class was not recognized, whether the sound event classification model corresponds to an audio scene associated with the audio data samples; and
means for storing, responsive to a determination that the sound event classification model corresponds to the audio scene associated with the audio data samples, model update data based on the audio data samples.

27. The device of claim 26, further comprising means for selecting the sound event classification model from among a plurality of sound event classification models based on a selection criterion.

28. The device of claim 26, further comprising means for updating the sound event classification model based on the model update data.

29. A non-transitory computer-readable medium storing instructions that are executable by a processor to cause the processor to:
provide audio data samples as input to a sound event classification model;
determine, based on an output of the sound event classification model responsive to the audio data samples, whether a sound class of the audio data samples was recognized by the sound event classification model;
based on a determination that the sound class was not recognized, determine whether the sound event classification model corresponds to an audio scene associated with the audio data samples; and
based on a determination that the sound event classification model corresponds to the audio scene associated with the audio data samples, store model update data based on the audio data samples.

30. The non-transitory computer-readable medium of claim 29, wherein the instructions further cause the processor to update the sound event classification model based on the model update data.

* * * * *